(12) United States Patent
Curtis et al.

(10) Patent No.: US 7,181,447 B2
(45) Date of Patent: Feb. 20, 2007

(54) METHODS AND SYSTEMS FOR CONCEPTUALLY ORGANIZING AND PRESENTING INFORMATION

(75) Inventors: Andy Curtis, Bunker Hill, WV (US); Alan Levin, Vancouver (CA); Apostolos Gerasoulis, Highland Park, NJ (US)

(73) Assignee: IAC Search and Media, Inc., Oakland, CA (US)

( * ) Notice: Subject to any disclaimer, the term of this patent is extended or adjusted under 35 U.S.C. 154(b) by 141 days.

(21) Appl. No.: 10/853,552

(22) Filed: May 24, 2004

(65) Prior Publication Data

US 2005/0125374 A1 Jun. 9, 2005

Related U.S. Application Data

(60) Provisional application No. 60/528,139, filed on Dec. 8, 2003.

(51) Int. Cl.
*G06F 17/30* (2006.01)
(52) U.S. Cl. .................. 707/3; 707/5; 707/6; 707/102; 709/203; 709/206; 715/513
(58) Field of Classification Search .................. 707/2, 707/3, 4, 5, 6, 104.1, 10, 100, 7, 101, 102; 715/513, 500; 709/203, 206, 225; 705/10; 702/19
See application file for complete search history.

(56) References Cited

U.S. PATENT DOCUMENTS

| | | | | |
|---|---|---|---|---|
| 5,845,278 A | * | 12/1998 | Kirsch et al. | 707/3 |
| 5,963,940 A | * | 10/1999 | Liddy et al. | 707/5 |
| 5,966,695 A | | 10/1999 | Melchione et al. | |
| 5,983,216 A | * | 11/1999 | Kirsch et al. | 707/2 |
| 5,987,446 A | * | 11/1999 | Corey et al. | 707/3 |
| 6,018,733 A | * | 1/2000 | Kirsch et al. | 707/3 |
| 6,026,388 A | * | 2/2000 | Liddy et al. | 707/1 |
| 6,029,195 A | * | 2/2000 | Herz | 707/10 |
| 6,038,561 A | | 3/2000 | Snyder et al. | |

(Continued)

OTHER PUBLICATIONS

Bookstein, Abraham et al., "Model Based Concordance Compression", Data Compression Conference, Mar. 24-27, 1992, pp. 82-91.*

(Continued)

*Primary Examiner*—Shahid Al Alam
(74) *Attorney, Agent, or Firm*—Blakely, Sokoloff, Taylor & Zafman LLP; Stephen M. De Klerk

(57) ABSTRACT

Methods and systems for conceptually organizing and presenting information. A correlation of multiple users' responses to the organization and presentation of information is used to determine an optimal organization and presentation of the information. For one embodiment of the invention, in the context of search engine result optimization, the user activity and/or user information of multiple users, during a search session, is correlated with queries to effect an evolving association between queries and the organization and presentation of documents. Systems in accordance with such embodiments employ the ability to store users' activity over the entire search session, thus making possible the correlation of a number of different types of user activity and user information. The use of correlated user input allows such systems to provide relevant search results without the limitations imposed by the keyword-based systems of the prior art.

24 Claims, 13 Drawing Sheets

U.S. PATENT DOCUMENTS

| | | | |
|---|---|---|---|
| 6,067,539 A * | 5/2000 | Cohen | 707/2 |
| 6,208,988 B1 * | 3/2001 | Schultz | 707/5 |
| 6,269,368 B1 * | 7/2001 | Diamond | 707/6 |
| 6,347,313 B1 * | 2/2002 | Ma et al. | 707/3 |
| 6,370,527 B1 * | 4/2002 | Singhal | 707/6 |
| 6,421,675 B1 * | 7/2002 | Ryan et al. | 707/100 |
| 6,438,579 B1 * | 8/2002 | Hosken | 709/203 |
| 6,446,035 B1 | 9/2002 | Grefenstette et al. | |
| 6,545,209 B1 | 4/2003 | Flannery et al. | |
| 6,578,025 B1 * | 6/2003 | Pollack et al. | 707/2 |
| 6,718,324 B2 | 4/2004 | Edlund et al. | |
| 6,785,671 B1 * | 8/2004 | Bailey et al. | 707/3 |
| 6,785,683 B1 * | 8/2004 | Zodik et al. | 707/101 |
| 6,901,411 B2 * | 5/2005 | Li et al. | 707/104.1 |
| 6,920,448 B2 | 7/2005 | Kincaid et al. | |
| 6,969,763 B1 | 11/2005 | Ecker et al. | |
| 6,974,860 B2 | 12/2005 | Quirk | |
| 7,013,238 B1 | 3/2006 | Weare | |
| 7,080,073 B1 * | 7/2006 | Jiang et al. | 707/7 |
| 2003/0004995 A1 * | 1/2003 | Novaes | 707/513 |
| 2003/0069877 A1 | 4/2003 | Grefenstette et al. | |
| 2003/0154196 A1 | 8/2003 | Goodwin et al. | |

OTHER PUBLICATIONS

Ravela, S. et al., "Image Retrieval Appearance", ACM SIGIR 1997, pp. 278-285.*

PCT International Search Report, International Application No. PCT/US04/41254; International Filing Date, Dec. 7, 2004; mailing date, Jan. 11, 2006 (3 pp.).

PCT International Search Report, International Application No. PCT/US04/41252; International Filing Date, Dec. 7, 2004; mailing date, Jan. 20, 2006 (5 pp.).

PCT International Search Report, International Application No. PCT/US04/41089; International Filing Date, Dec. 7, 2004; mailing date, Nov. 1, 2005 (3 pp.).

PCT International Search Report, International Application No. PCT/US04/41255; International Filing Date, Dec. 7, 2004; Mailing Date, Apr. 12, 2006 (4 pp.).

International Preliminary Report on Patent Ability, Internation Application No. PCT/US04/41089; International Filing Date, Dec. 7, 2004; mailing date, Apr. 27, 2006 (6 pp.).

* cited by examiner

METHODS AND SYSTEMS FOR CONCEPTUALLY ORGANIZING AND PRESENTING INFORMATION

CLAIM OF PRIORITY

This application is related to, and hereby claims the benefit of, and incorporates by reference, provisional application No. 60/528,139, which was filed Dec. 8, 2003.

RELATED APPLICATIONS

This application is related to U.S. patent application Ser. No. "10/853,860", entitled "METHODS AND SYSTEMS FOR PROVIDING A RESPONSE TO A QUERY", filed on May 25, 2004, which is incorporated herein by reference. This application is related to U.S. patent application Ser. No. "10/917,721", entitled "METHODS AND SYSTEMS FOR PROVIDING A RESPONSE TO A QUERY", filed on Aug. 12, 2004, which is incorporated herein by reference. This application is related to U.S. patent application Ser. No. "10/944,251", entitled "METHODS AND SYSTEMS FOR PROVIDING A RESPONSE TO A QUERY", filed on Sep. 16, 2004, which is incorporated herein by reference.

FIELD

Embodiments of the invention relate, generally, to the field of conceptually organizing information, and more specifically to the analysis of the use of conceptually related information to effect organization of information.

BACKGROUND

The capability of organizing information has grown along with the ever-increasing availability of information. A vast source of available information may be found on internet-related networks (e.g. the World Wide Web (Web)) or other Internet sources. The Internet is an extensive network of computer networks through which information is exchanged by methods well known to those in the art (e.g. the use of TCP and IP protocols, etc). The Internet permits users to send and receive data between computers connected to this network. This data may include web sites, home pages, databases, text collections, audio, video or any other type of information made available over the Internet from a computer server connected to the Internet. This information may be referred to as articles or documents, and may include, a web page, data on a web page, attachments to a web page, or other data contained in a storage device (e.g., database).

Making sense of such a very large collection of documents, and foraging for information in such environments, is difficult without specialized aids. One such aid to assist in locating information is the use of key terms. That is, the articles may include key terms representing selected portions of the information contained in the article. These key terms are available over the Internet to other computers and permit these other computers to locate the article.

To locate articles on the Internet, a user of a remote computer searches for the key terms using a search program known as a search engine. Search engines are programs that allow the remote user to type in one or more search terms. The search engine then compares the search query with the key terms from the articles and retrieves at least a portion of the articles having key terms that match the search query. The search engine will then display to the user the portion of the article such as the title. The user can then scroll through these retrieved portions of the articles and select a desired article.

Early key-term search engines have exhibited serious drawbacks. For example, to increase exposure of a particular document, the document provider may use as many search terms as are possibly related to the article. In fact, some articles or search engines use every word in the article as key terms. As a result, search engines will retrieve many articles that are unrelated, or only peripherally related, to the subject matter that the user desires to find through a combination of search terms. Additionally, many users of such search engines are not skilled in formulating key-term search queries and produce extremely broad searches that often retrieve thousands of articles. The user must then examine the excerpted information regarding each document to locate the desired information.

This drawback was addressed by the evolution of search engines to include the organization of information based upon the search activity of one or more users. Such schemes rank results based upon a consensus of user preferences instead of document-oriented parameters (e.g., text). One such scheme ranks documents according to an evolving score based upon the key terms used. That is, the documents receive a relevancy score relative to the key terms of the search query. As users enter search queries and select documents from among the list of documents the query produces, the relevancy scores of the documents are adjusted. The scores are used to organize the resulting list of documents for subsequent searches. Such schemes typically base relevancy, at least in part, on the number of "clicks" the document received (i.e., the number of times a document was selected). Such schemes, known generally as "popularity ranking schemes" or "click popularity schemes", provide a search result list in which the highest ranked documents are those that attracted and satisfied the greatest number of previous users. Moreover, click popularity schemes generate results that reflect search context. For example, previous search schemes would return documents containing all of the query terms, but would not automatically exclude words that are not part of the query. Thus, a text-matching search for "Mexico" might return mostly results about "New Mexico." A click popularity scheme search will reduce such erroneous results, as users seeking "Mexico" will generally refrain from clicking pages about "New Mexico" and will tend to click those pages that they discern are most relevant to "Mexico," thus raising the relevancy of the desired documents.

Basing relevancy on the number of clicks may lead to erroneous results over time as information related to the query terms changes. For example, for the particular query of "democratic frontrunner," documents referring to the early-stage frontrunner Howard Dean may have been selected numerous times in December 2003, but the user in March 2004 entering that query may have been anticipating results for John Kerry who was then leading. Additionally, top-ranked results generally receive disproportionately greater use resulting in increasingly skewed search results in which the top-ranked results may never be displaced.

Some of these drawbacks have been addressed by search engines that organize information provided in response to queries using numerous factors including time-based and use-based factors. For example, such a scheme may use the activity of previous users in response to particular queries to adjust the relevancy of the query response documents. Such user activity may include the number of clicks in conjunction with the timing of prior users' selections or use of particular information. Such schemes may also consider where in a prior results listing a particular document was ranked when prior users selected it, actual versus expected use frequency of a document, and how the selected documents were used.

Yet, many drawbacks still exist in the current schemes. For example, current schemes do not address the problem of very rare queries for which sufficient user activity data has not been compiled. In such cases, results may be poor or non-existent. Additionally, click results are dependent upon the quality and integrity of the data source. Current schemes fail to account for the wide variations in data source quality. Moreover, current schemes are subject to spurious influences that may affect the integrity of the search results. One exemplary scheme, in accordance with the prior art, attempts to address certain drawbacks by updating search engine results based upon user activity. This scheme is described in U.S. Pat. No. 6,421,675 entitled "Search Engine" which is hereby incorporated by reference herein, to provide a fuller description of the prior art and clearly distinguish features of various embodiments of the present invention.

SUMMARY

An embodiment of the invention provides a method in which a set of conceptually related information is provided to a plurality of users. One or more responses regarding the presentation of the conceptually related information is received from each of two or more users. The response from two or more users is then correlated and the presentation of the conceptually related information is modified based upon the correlated responses.

BRIEF DESCRIPTION OF THE DRAWINGS

The invention may be best understood by referring to the following description and accompanying drawings that are used to illustrate embodiments of the invention. In the drawings.

DETAILED DESCRIPTION

Overview

Embodiments of the invention provide methods and systems for conceptually organizing and presenting information in which a correlation of users' responses to the organization and presentation of information is used to determine an optimal organization and presentation of the information. For one embodiment of the invention, in the context of search engine result optimization, the user activity and/or user information of multiple users, during a search session, is correlated with queries to effect an evolving association between queries and the organization and presentation of documents. Systems, in accordance with such embodiments, employ the ability to store users' activity over the entire search session, thus, making possible the correlation of a number of different types of user activity and user information. The use of correlated user input allows such systems to provide relevant search results without the limitations imposed by the key-word-based systems of the prior art.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Process

Figure 1:
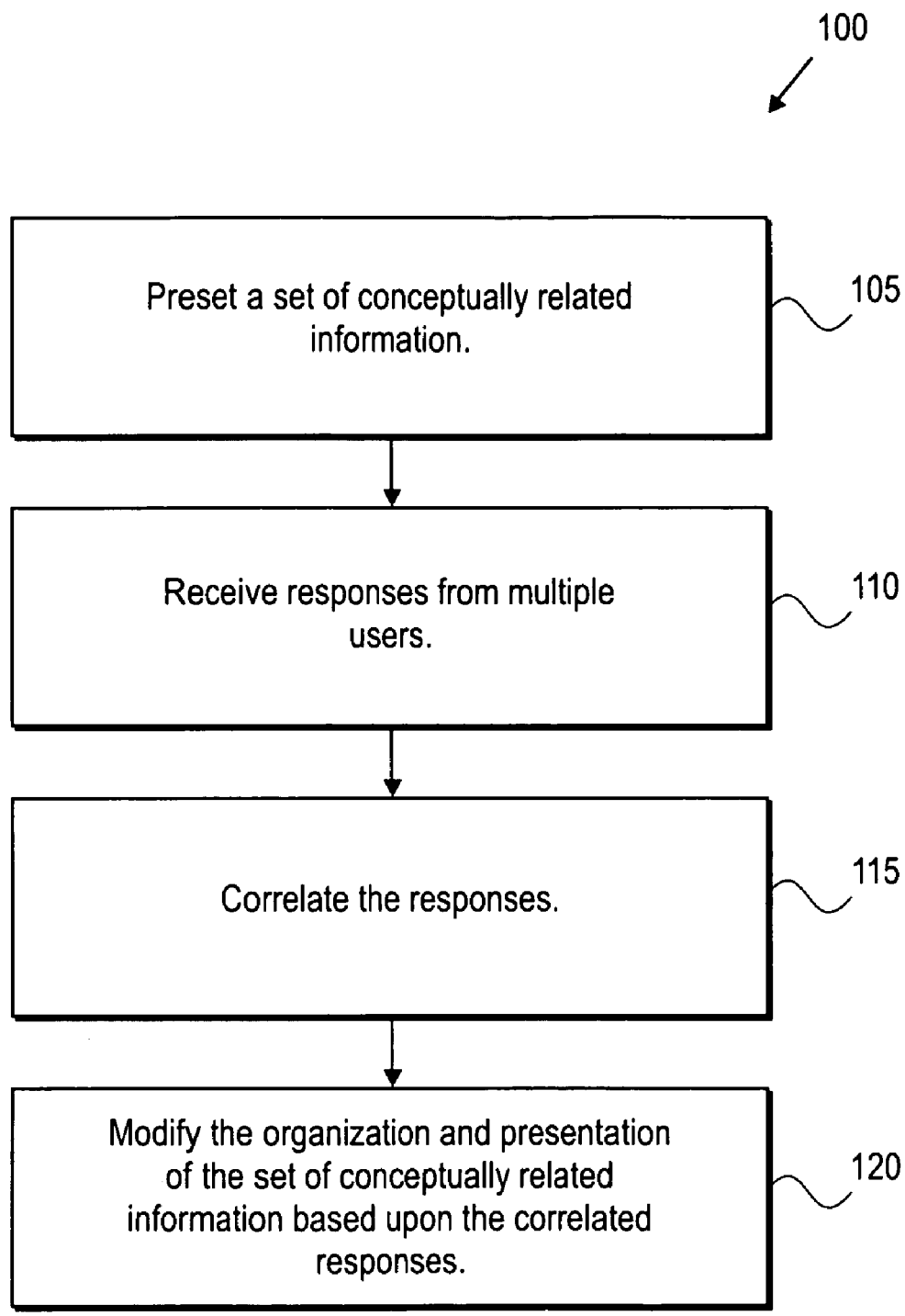
FIG. 1 is a flow chart that illustrates a process in which the organization and presentation of a set of conceptually related information is modified based upon a correlation of responses from multiple users in accordance with one embodiment of the invention.

FIG. 1 illustrates a process by which the organization and presentation of a set of conceptually related information is modified based upon a correlation of responses from multiple users in accordance with one embodiment of the invention.

Process 100, shown in FIG. 1, begins with operation 105 in which a set of conceptually related information is organized and presented to multiple users by an information provider. For one embodiment, the set of conceptually related information is a gathering page containing information related to a general concept of interest to a particular group of users. Such a gathering page, may contain a number of related sub-concepts of any sort, including links to documents, directories, databases, spreadsheets, news items, audio, video, images, applications, advertisements, product descriptions, and reference information, as well as links to lists, tables, trees, or catalogs of any of the above items, and links to other gathering pages, all of which may be collected from any number of sources. For one such embodiment, multiple, distinctly formulated, gathering pages are created that vary the organization and presentation of the set of information, including the number, type, arrangement, and prominence of the related sub-concepts. In this way, the information provider attempts to anticipate an optimal way of organizing and presenting the information.

At operation 110, the information provider receives responses from the users in regard to the organization and presentation of the information. The users' responses may be in the form of selecting (or refraining from selecting) portions of the information. For example, some users may select information of particular sub-concepts of a given gathering page, while not selecting others.

At operation 115, the received responses from multiple users are correlated. That is, a determination is made as to the extent to which the same statistically significant associations have been made by independent users. For alternative embodiments of the invention, the correlation of responses may take many forms. Exemplary correlations for various user responses are described in more detail below.

At operation 120, the organization and presentation of the set of conceptually related information is modified based upon the correlated responses. For example, a gathering page may be reformulated to more adequately meet the needs of the an individual user, a group or class of users, or all users. In addition to modifying the presentation of the originally presented information, such reformulation may include adding or deleting information. For example, one or more sub-concepts may be added to or deleted from a gathering page.

Though described generally above in relation to using user responses to optimize the organization and presentation of information sets (e.g., gathering pages), embodiments of the invention may be used to effect the association of user search engine queries to stored content (e.g., one or more documents). That is, embodiments of the invention may be used to determine search results in response to a particular query that are more relevant (i.e., either generally more relevant or more relevant to a particular user).

Figure 2:
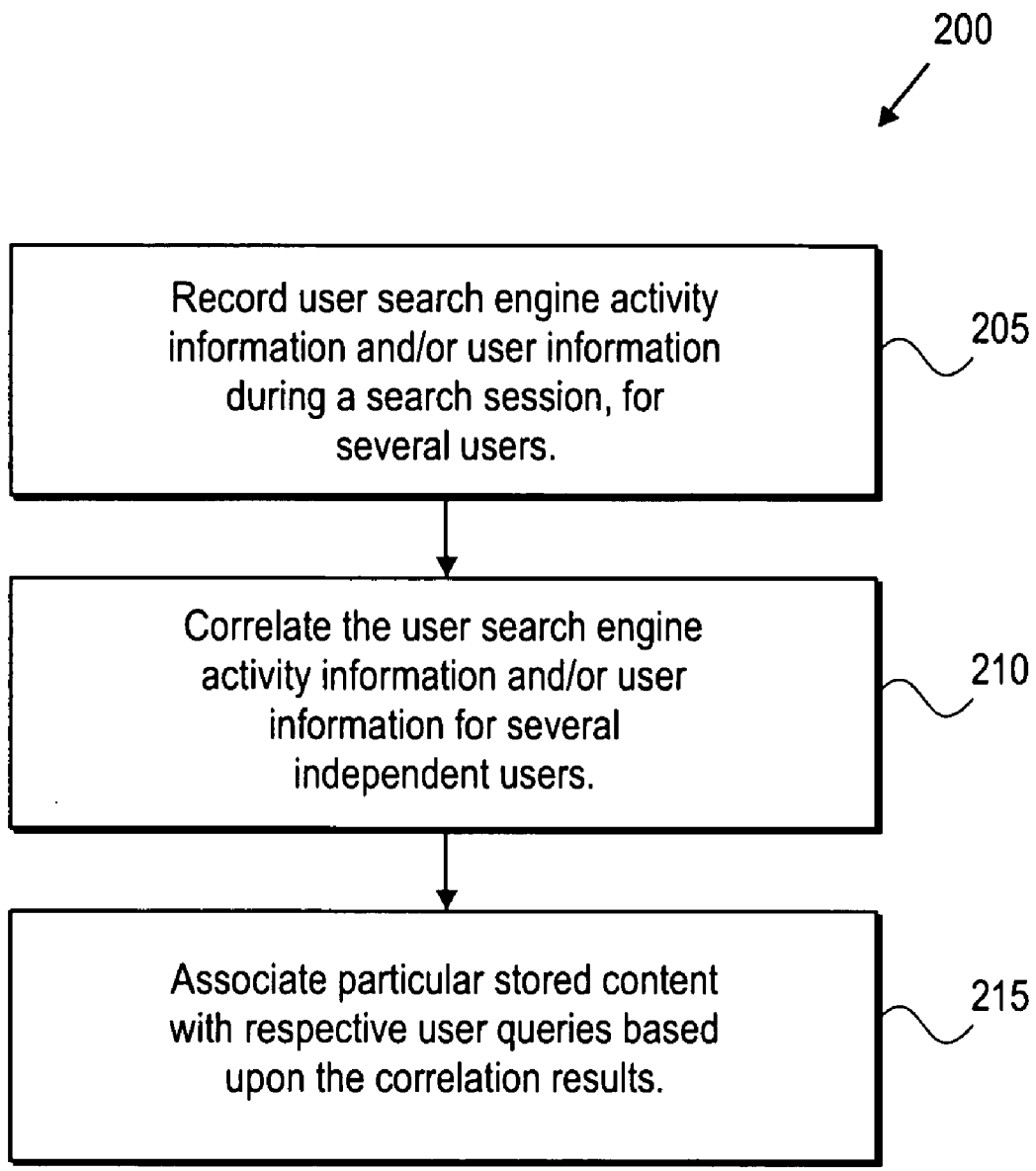
FIG. 2 is a flow chart that illustrates a process by which an association of stored content with a user query is effected based upon the correlation of user activity and/or user information obtained during a search session with similar information of other users in accordance with one embodiment of the invention.

FIG. 2 illustrates a process by which an association of stored content with a user query is effected, based upon the correlation of user search engine (USE) activity and/or user information obtained during a search session with similar information of other users in accordance with one embodiment of the invention.

Process 200, shown in FIG. 2, begins at operation 205 in which USE activity information and/or user information, during a search session, is recorded for several independent users. A search session includes any sequence of search engine actions (activities that can be recorded by the search engine) of a given user. The USE activity may include the issuing of queries, the clicking of links on the search page leading to internal or external data, the clicking of links on subsequent internal pages leading to internal or external data, and a return to the search page or any internal page subsequent to clicking an internal or external link. The USE activity may be continuous or occur within a practical duration period. That is, a time period may be specified that indicates termination of a search session. For example, if an interruption in recorded user activity exceeded a specified time, it may be practical to assume the search session was terminated. Subsequent user activity may be viewed as a new search session.

At operation 210, the recorded USE activity information and/or user information for several independent users is correlated. The information, which reflects entire search sessions for each user, may be correlated in various ways in accordance with alternative embodiments of the invention. Exemplary correlations for various USE activity and/or user information are described in more detail below.

At operation 215, the results of the correlation of the recorded USE activity information and/or user information for several independent users obtained from operation 210 are used to effect an association between particular stored content and corresponding user queries. Such association may provide a search result for a given query having greater relevance, in general, or to one or more particular users.

System

Figure 3:
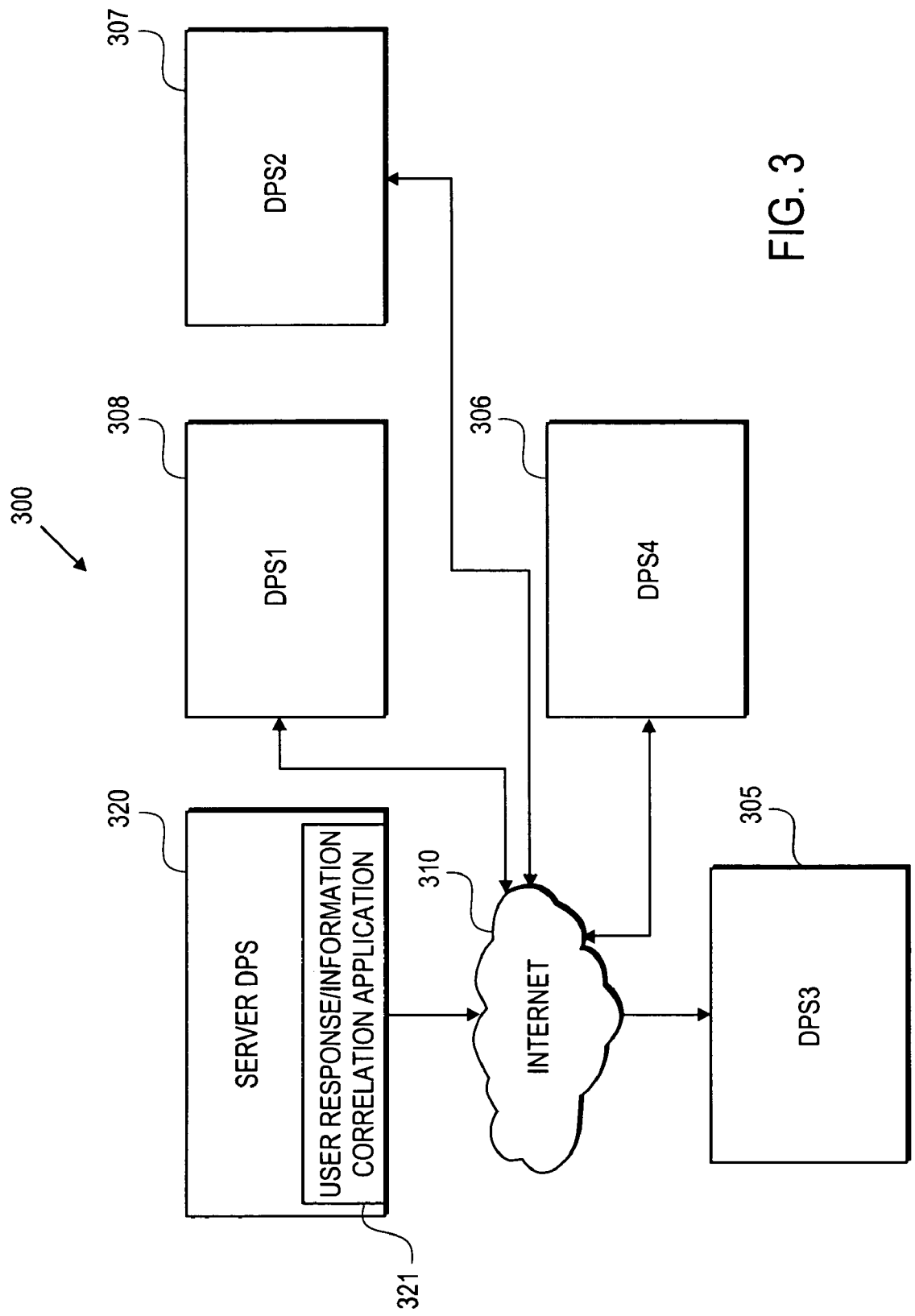
FIG. 3 is a block diagram that illustrates a system for organizing and presenting conceptually related information and associating particular stored content with respective user queries in accordance with one embodiment of the invention.

Embodiments of the invention may be implemented in a network environment. FIG. 3 illustrates a system for organizing and presenting conceptually related information and associating particular stored content with respective user queries in accordance with one embodiment of the invention. System 300, shown in FIG. 3, illustrates a network of digital processing systems (DPS) 300 that include one or more server DPSs, shown as server DPS 320 and a plurality of client DPSs, shown as client DPSs 305–308. The DPSs of system 300 are coupled one to another and are configured to communicate a plurality of various types of stored content including documents, such as, web pages, content stored on web pages, including text, graphics, and audio and video content. For example, the stored content may be audio/video files, such as programs with moving images and sound. Information may be communicated between the DPSs through any type of communications network through which a plurality of different devices may communicate, such as, for example, but not limited to, the Internet, a wide area network (WAN) not shown, a local area network (LAN), an intranet, or the like. For example, as shown in FIG. 3, the DPSs are interconnected one to another through Internet 310, which is a network of networks having a method of communicating data, as described above, and is well known to those skilled in the art. The communication links coupling the server DPS to client DPSs need not be a direct link, but may be indirect links including, but not limited to, broadcasted wireless signals, network communications, or the like. While exemplary DPSs are shown in FIG. 3, it is understood that many such DPSs are interconnected.

An embodiment of a digital processing system that may be used for the server DPS 320 or the client DPSs 305–308, in accordance with an embodiment of the invention, is described below in reference to FIG. 12.

In accordance with one embodiment of the invention, a set of conceptually related information, such as a gathering page, is presented to several users via client DPSs 305–308. The conceptually related information may also be a search result in response to a user query, communicated from one or more of the client DPSs 305–308. The information may take many forms, and may be, for example, a list of web-page URL addresses provided by a web-page developer. Once presented on the client DPSs, the user makes some response to the presentation. For example, the user may conduct USE activity as described above. The user response and other user information, related to the presentation of the information to the user, is recorded and communicated to the user response/information correlation application 321. The application 321 correlates the user responses and information of several users and modifies the organization and presentation of the conceptually related information based upon the correlation results.

Data Analysis

Embodiments of the invention obtain USE activity information and/or user information and correlate this information to aid in defining relevancy through the use of consensus choices of multiple users. This correlation analysis includes the process of evaluating common actions, or information of multiple users, to identify statistically significant associations. The terms "association" and "statistically significant association", as used in regard to such embodiments, are defined as follows. An "association" is any pairing of queries, terms, concepts, articles or other web data, or combinations thereof, which are made explicitly or implicitly, consciously or unconsciously, by a user during a search session. An association may be indicated through the issuing of queries and/or the selecting of links (e.g., hypertext links) to queries, terms, concepts, articles, or other web data. A statistically significant association is an association that is probably not attributable to random occurrence. A correlation is recorded when a statistically significant association is made by two or more ostensibly independent users.

Embodiments of the invention provide search engine results with far greater relevancy than prior art schemes by recording much more information and more specific information (including USE activity information and/or user information), and effecting a more in-depth analysis of the information.

One embodiment of the invention provides a system that creates and operates on data files that maintain all USE activity information and user information as shown in Table 1. (Tables used to describe various embodiments of the invention are exemplary and do necessarily represent the actual data structures of embodiments of the invention.)

TABLE 1

| Timestamp | User ID | Query | Pick (URL) |
|---|---|---|---|
| Jan. 1, 2003 00:00:00 | U1 | Q1 | P5 |
| Jan. 1, 2003 00:01:00 | U1 | Q2 | P1 |
| Jan. 1, 2003 00:02:00 | U1 | Q2 | P2 |
| Jan. 1, 2003 00:02:05 | U1 | Q2 | P3 |
| Jan. 2, 2003 00:00:00 | U2 | Q2 | P4 |
| Jan. 2, 2003 00:01:00 | U2 | Q2 | P1 |
| Jan. 2, 2003 00:02:00 | U2 | Q2 | P4 |
| Jan. 2, 2003 00:04:00 | U2 | Q1 | P2 |
| Jan. 2, 2003 00:04:05 | U2 | Q1 | P3 |
| Jan. 3, 2003 00:00:00 | U3 | Q3 | P3 |
| Jan. 3, 2003 00:04:00 | U3 | Q2 | P1 |
| Jan. 3, 2003 02:00:00 | U3 | Q3 | P5 |

TABLE 1-continued

| Timestamp | User ID | Query | Pick (URL) |
|---|---|---|---|
| Jan. 4, 2003 00:00:00 | U4 | Q1 | * |
| Jan. 4, 2003 00:06:00 | U4 | Q2 | P4 |

(*= query with no associated pick)

Table 1 shows a data file containing a number of data elements that record the queries for a number of users at various times and the URL (pick) that was selected (clicked) subsequent to each respective query for each respective user. Such a data file, may contain numerous other data elements representing USE activity information and/or user information. Such data elements, may represent, for example, the display rank of the result selected, the order the result was clicked by the user during the session, the user IP address, geo-location of the IP address, etc.

This is in contrast to various prior art schemes in which, after periodic processing and loading of new data, simplified query-to result pick (Q2RP) correlations were rolled up into a database table such as Table 1A. In accordance with one embodiment of the invention, such information is not rolled up, but is maintained in log form, with data elements indicating all of the USE activity information and user information.

TABLE 1A

| Query | Pick (URL) | Score |
|---|---|---|
| Q1 | P2 | 1 |
| Q1 | P3 | 1 |
| Q1 | P5 | 1 |
| Q2 | P1 | 3 |
| Q2 | P3 | 1 |
| Q2 | P4 | 2 |
| Q3 | P3 | 1 |
| Q3 | P5 | 1 |

Table 1A is a simplified example of prior art data structure, which may include score adjustment fields, as known in the prior art. For example, a score, which could be something as simple as the sum of the picks, could also be the result of a more sophisticated adjustment algorithm; the scores and adjustments could also be stored.

The prior art data structure of Table 1A was adequate for producing ranked search results, but it represented the loss of a great deal of raw information. As exemplified in Table 1A, prior art schemes did not record or analyze much of the USE activity information and user information available from a search session. This was due to a number of reasons including limited storage, lack of any practical use for the information, and lack of appreciation of the application to which such information could be applied.

In accordance with one embodiment of the invention, the need for such score adjustment fields is obviated by the extent of the recorded and stored information. That is, for such embodiments, no score adjustment information is stored because any score needed can be calculated parametrically based on the stored information. Moreover, parameters and algorithms for calculating scores can be altered, as necessary, without affecting stored data.

In accordance with various embodiments of the invention, the in-depth analysis of the information depends upon the ability to recognize and record correlative data (including USE activity information and user information) between independent users. That is, by recording and analyzing much more of the information, including up to all of the information of a user session, search results having a much higher degree of relevancy can be obtained.

For example, consider a user session in which a user issues a series of queries and intervening picks. In general, the URLs picked prior to the issuing of query A will be irrelevant to query A, since users will often change topics. Similarly, most picks occurring after a subsequent query B, will be irrelevant to query A.

Further, consider a number of independent users who all record search sessions containing query A. Such users can be expected to turn to a variety of unrelated topics before and after query A, and therefore, the irrelevant picks will be widely scattered over a huge number of URLs, each of which will garner very low scores reflecting their lack of association with query A. Typically, only a very small number of relevant URLs that are picked by those users who do remain on those topics related to query A, will accumulate click popularity scores high enough to affect the re-ranking of the search results associated with query A.

For example, imagine 1000 users who search for query A. Subsequently, 900 of them then turn to unrelated queries B1 through B900. The remaining 100 continue to search on the variations of the original topic and turn to related queries A1–A9. The results generated by the B queries will each collect a pick or two that will be associated with query A, but the results generated by related queries A1–A9 will accumulate ten times as many picks on average.

For one embodiment of the invention, a requirement that a URL, following a subsequent query, must be picked at least twice to be correlated to an original query may be imposed. Such a requirement, will eliminate many of the picks of the B queries erroneously associated with query A.

In accordance with one embodiment of the invention, a correlation analysis is provided that relies on statistically large samples to recognize multiple relevant associations. For such embodiments, prior art restrictions on the associations analyzed, and arbitrary compartmentalization of the data, are reduced to increase relevancy. That is, recording and analyzing much more of the user session information also allows for many more relevant types of associations to be analyzed.

Exemplary Use Activity Correlations

In accordance with one embodiment of the invention, a system is provided that uses one or more of a small set of basic correlations, and combinations thereof. In general, any number of correlations may be determined and used to effect increased relevancy of search results, or other objectives, in accordance with various embodiments of the invention. Some exemplary correlations will be discussed, in detail, below.

Query-to-Pick

A query-to-pick (Q2P) correlation associates a query with a pick. When multiple independent users make the same association, that is a correlation candidate. When a search engine returns a result in response to a query and a user picks that result, this is a special case of such a correlation (Q2RP). In effect, the search engine algorithm replaces a second independent user. In accordance with one embodiment of the invention, the Q2P correlation associates a query with all picks in a user session. This is in contrast to prior art schemes that terminated association of a given query with picks upon issuance of a subsequent query.

With Q2P, all picks recorded during a user session are associated with a given query issued during that user session. For one embodiment, a score is assigned to each association, based upon various factors, including the time between query and pick, the number of intervening queries and/or picks, and the order of queries with respect to picks.

In addition, each association's score can be adjusted, based upon well-known factors, including rank of the pick in the result list at the time of association, duration of the pick (interval until next known user action), age or order of the association (relative to older or newer associations), and age of the first known instance of association.

Each user session can be of infinite duration. In a practical application, a reasonable time limit, or limit on intervening actions, should be imposed beyond which no relationship between picks and queries will be assigned. Alternatively or additionally, an interruption of sufficient duration can indicate a break in sessions. A search log excerpt, in accordance with one embodiment of the invention, is shown below as Table 2. In various alternative embodiments, any other items could be captured in the search log, but are excluded here for clarity.

TABLE 2

| Row | Timestamp | User ID | Query | Pick (URL) |
|---|---|---|---|---|
| 101 | Jan. 1, 2003 00:00:00 | U1 | Q1 | P5 |
| 102 | Jan. 1, 2003 00:01:00 | | Q2 | P1 |
| 103 | Jan. 1, 2003 00:02:00 | | | P2 |
| 104 | Jan. 1, 2003 00:02:05 | | | P3 |
| 201 | Jan. 2, 2003 00:00:00 | U2 | Q2 | P4 |
| 202 | Jan. 2, 2003 00:01:00 | | | P1 |
| 203 | Jan. 2, 2003 00:02:00 | | | P4 |
| 204 | Jan. 2, 2003 00:04:00 | | Q1 | P2 |
| 205 | Jan. 2, 2003 00:04:05 | | | P3 |
| 301 | Jan. 3, 2003 00:00:00 | U3 | Q3 | P3 |
| 302 | Jan. 3, 2003 00:04:00 | | Q2 | P1 |
| 303 | Jan. 3, 2003 02:00:00 | | Q3 | P5 |
| 401 | Jan. 4, 2003 00:00:00 | U2 | Q1 | * |
| 402 | Jan. 4, 2003 00:06:00 | | Q2 | P4 |

(*= query with no associated pick)

Figure 4:
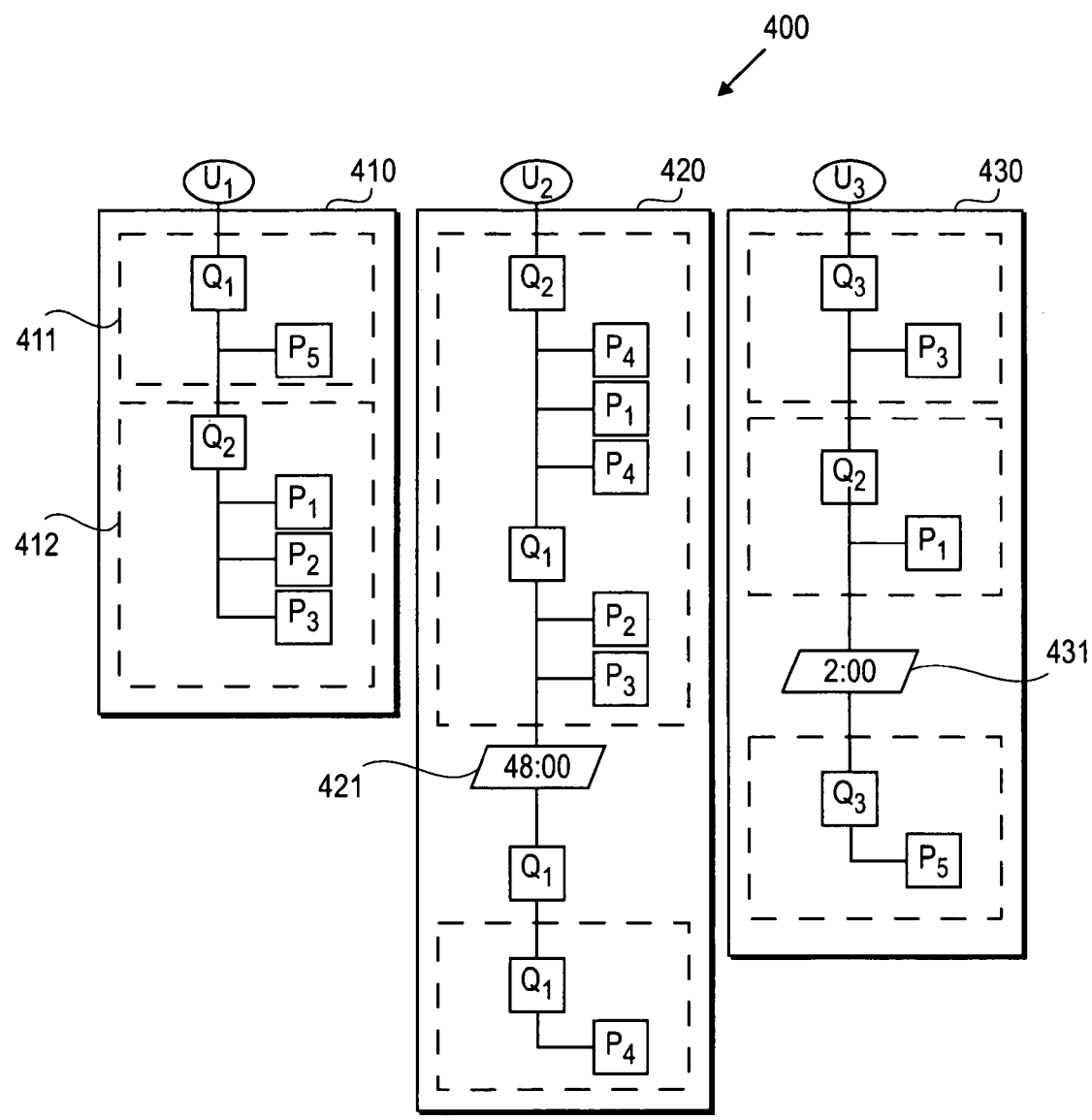
FIG. 4 illustrates the search log for each of three independent users in accordance with one embodiment of the invention.

FIG. 4 illustrates the search log for each of three independent users in accordance with one embodiment of the invention. Search log excerpt 400 shown in FIG. 4 contains search logs 410, 420, and 430 depicting the search information for three independent users, U1, U2, and U3, respectively, as described above in reference to Table 2. The dashed boxes in each search log represent the Q2RP portion of the Q2P search information. For example, search log 410 includes Q2RP portion 411 in which a query Q1 has resulted in a pick P5. Search log 410 also includes Q2RP portion 412 in which a query Q2 has resulted in picks P1, P2, and P3.

Search log 420 includes an interruption 421 of 48 hours duration. For one embodiment of the invention, such a lengthy interruption may delineate two separate sessions across which no relationship between picks and queries will be assigned. In contrast, search log 430 includes an interruption 431 of 2 hours duration. For one embodiment of the invention such interruption may not delineate two separate user sessions. That is, all of the search activity of search log 430 may be viewed as a single user session and the information correlated accordingly.

Table 2A illustrates a tabulation of the click information contained in Table 2 in accordance with an embodiment of the invention. For comparison, Table 2B illustrates a tabulation of the click information contained in Table 2 in accordance with a typical prior art

TABLE 2A (Q2P Results)

|    | Q1 | Q2 | Q3 |
|----|----|----|----|
| P1 | 2  | 3  | 1  |
| P2 | 1  | 1  | —  |
| P3 | 2  | 3  | 1  |
| P4 | 1  | 1  | —  |
| P5 | 1  | 2  | 1  |

TABLE 2B (Q2RP Results of Prior Art)

|    | Q1 | Q2 | Q3 |
|----|----|----|----|
| P1 | —  | 3  | —  |
| P2 | 1  | —  | —  |
| P3 | 1  | 1  | 1  |
| P4 | —  | 2  | —  |
| P5 | 1  | —  | 1  |

Due to the fact that numerous factors can vary or penalize the scores, we will assume 1 pick=a score increment of +1, except for the following penalization situations, where we will assume the pick represents a score increment of 0. Assuming a time threshold, the click in row 103 is penalized in both tabulations due to the user spending a very short time at the URL. Assuming daily database batch updates, the click in row 203 would typically be penalized by the prior art tabulation of Table 2B as a duplicate of click 201. The clicks in rows 203 and 402 are penalized by the tabulation, in accordance with an embodiment of the invention, as duplicates of click 201.

For Query Q1, URL P1, which was never clicked immediately subsequent to Q1, has garnered a high score in the tabulation, in accordance with an embodiment of the invention, because multiple users chose it before or after—though not immediately after—issuing Query Q1. The whole matrix of scores for the tabulation, in accordance with an embodiment of the invention, is richer, as many more associations are noted. Some scores, such as that for Q2P4, are lower, due to the retention of session data indicating that all the clicks came from a single user, permitting the identification of more duplicates.

In practical applications of Q2P, we can retain the distinction as to whether a particular association was Q2RP or non-Q2RP. A single, uncorrelated non-Q2RP click (such as Q3P1 in the table) may not inspire enough confidence to release the result to users, whereas for a single, uncorrelated Q2RP click, the association is reinforced by the fact that the search engine presented the result for the original search.

Pick-to-Query

A pick-to-query (P2Q) correlation associates all queries recorded during a user session that are correlated with a given pick issued during that user session. The search log excerpt of Table 2 illustrates the output of P2Q correlation. That is, the same data generated for Q2P can be re-indexed for P2Q Query-to-Query A query-to-query (Q2Q) correlation associates all queries issued during a user session with all other queries issued during that session. For one embodiment, a score may be assigned to each association based upon various factors, including the time between queries, the number of intervening queries and/or picks, age or order of the association (relative to older or newer associations), whether or not the query results generated picks, and the pair-wise order of the associated queries, among others.

Determining if the query results generated picks, as well as the pair-wise order of the associated queries, can be particularly informative, as they can indicate whether one query is a "correction" of another. For any practical application, it is useful to know which of two associated queries is an error, and which, a correction.

A search log excerpt, in accordance with one embodiment of the invention, is shown below as Table 3. Only the query portion of the search log is required to create a Q2Q table.

TABLE 3

| Row | Timestamp            | User ID | Query |
|-----|----------------------|---------|-------|
| 101 | Jan. 1, 2003 00:00:00 | U1      | Q1    |
| 102 | Jan. 1, 2003 00:01:00 |         | Q2    |
| 103 | Jan. 1, 2003 00:02:00 |         |       |
| 104 | Jan. 1, 2003 00:02:05 |         |       |
| 201 | Jan. 2, 2003 00:00:00 | U2      | Q2    |
| 202 | Jan. 2, 2003 00:01:00 |         |       |
| 203 | Jan. 2, 2003 00:02:00 |         |       |
| 204 | Jan. 2, 2003 00:04:00 |         | Q1    |
| 205 | Jan. 2, 2003 00:04:05 |         |       |
| 301 | Jan. 3, 2003 00:00:00 | U3      | Q3    |
| 302 | Jan. 3, 2003 00:04:00 |         | Q2    |
| 303 | Jan. 3, 2003 02:00:00 |         | Q3    |
| 401 | Jan. 4, 2003 00:00:00 | U2      | Q1    |
| 402 | Jan. 4, 2003 00:06:00 |         | Q2    |

Table 3A illustrates a tabulation of the click information contained in Table 3 in accordance with an embodiment of the invention (assuming the order of queries issued is ignored).

TABLE 3A (Q2Q Results)

|    | Q1 | Q2 | Q3 |
|----|----|----|----|
| Q1 | —  | 2  | —  |
| Q2 | —  | —  | 1  |
| Q3 | —  | —  | —  |

The lower triangular area of Table 3A can be used to retain the pair-wise query order information, avoiding double-booking cases like rows 301–303.

As noted above, a scoring scheme may be employed in which numerous factors can vary or penalize the score. For example, duplicates (e.g., association in rows 101 and 102 and associations made in rows 401 and 402) could be penalized. Or, for example, an uncorrelated Q2Q association, like Q2Q3, would not inspire enough confidence to release the result to users.

Pick-to-Pick

A pick-to-pick (P2P) correlation associates all picks issued during a user session with all other picks issued during that session, and as such, is analogous to the Q2Q correlation described above. Again, in accordance with various embodiments, a score may be assigned to each association based upon various factors, including the time between picks, the number of intervening queries and/or picks, age or order of the association (relative to older or newer associations), and the pair-wise order of the associated picks, among others.

A search log excerpt, in accordance with one embodiment of the invention, is shown below as Table 4. Only the pick portion of the search log is required to create a P2P table.

TABLE 4

| Row | Timestamp | User ID | Pick (URL) |
|---|---|---|---|
| 101 | Jan. 1, 2003 00:00:00 | U1 | P5 |
| 102 | Jan. 1, 2003 00:01:00 | | P1 |
| 103 | Jan. 1, 2003 00:02:00 | | P2 |
| 104 | Jan. 1, 2003 00:02:05 | | P3 |
| 201 | Jan. 2, 2003 00:00:00 | U2 | P4 |
| 202 | Jan. 2, 2003 00:01:00 | | P1 |
| 203 | Jan. 2, 2003 00:02:00 | | P4 |
| 204 | Jan. 2, 2003 00:04:00 | | P2 |
| 205 | Jan. 2, 2003 00:04:05 | | P3 |
| 301 | Jan. 3, 2003 00:00:00 | U3 | P3 |
| 302 | Jan. 3, 2003 00:04:00 | | P1 |
| 303 | Jan. 3, 2003 02:00:00 | | P5 |
| 401 | Jan. 4, 2003 00:00:00 | U2 | * |
| 402 | Jan. 4, 2003 00:06:00 | | P4 |

Table 4A illustrates a tabulation of the click information contained in Table 4 in accordance with an embodiment of the invention (assuming the order of picks recorded is ignored).

TABLE 4A (P2P Results)

| | P1 | P2 | P3 | P4 | P5 |
|---|---|---|---|---|---|
| P1 | — | 1 | 3 | 1 | 2 |
| P2 | | — | 1 | 1 | — |
| P3 | | | — | 1 | 2 |
| P4 | | | | — | |
| P5 | | | | | — |

Again, duplicates (associations involving row 201 and those involving row 203) could be penalized, as well as the user spending a very short time at the URL.

The lower triangular area of Table 4A can be used to retain the pair-wise pick order information, avoiding double-booking cases like rows 201–203.

Combinations of Exemplary Use Activity Correlations

In accordance with various alternative embodiments of the invention, two or more correlations (e.g., the basic correlations described above) can be concatenated to provide more relevant search results. For example, two or more basic correlations may be concatenated so as to mock the basic correlations in order to augment their results, especially in cases of sparse data, or generate additional products requiring broad matching.

Concatenated correlations use picks or queries, rather than users, to form the links between other picks and queries. In general, therefore, the more correlations concatenated, the farther afield from the initial pick or query the results will be. Thus, in many cases, concatenating the fewest correlations to effect the desired result will be the optimal approach.

Table 5 illustrates the possible combinations of two correlations for the basic correlations of USE activity described above.

TABLE 5

| Correlation | Combination | Basic analogy | Yields |
|---|---|---|---|
| QPQ | Q2P + P2Q | Q2Q | Queries related to picks related to the original query |
| QQQ | Q2Q + Q2Q | Q2Q | Queries related to queries related to the original query |
| PQQ | P2Q + Q2Q | P2Q | Queries related to queries related to the original pick |
| PPQ | P2P + P2Q | P2Q | Queries related to picks related to the original pick |
| PPP | P2P + P2P | P2P | Picks related to picks related to the original pick |
| PQP | P2Q + Q2P | P2P | Picks related to queries related to the original pick |
| QQP | Q2Q + Q2P | Q2P | Picks related to queries related to the original query |
| QPP | Q2P + P2P | Q2P | Picks related to picks related to the original query |

Concatenating correlations can introduce erroneous relationships; therefore, for one embodiment of the invention, the correlations are correlated. For example, if a Q2Q correlation requires two independent users, a QQQ correlation string should require two queries that link the original and final queries. In QQQ, a mutually associated query (Q3) associates a query (Q1) with another query (Q2). If two or more independent, mutually associated queries make the same association, that is a correlation.

As discussed above in reference to basic correlations, every association between the original pick or query and the output pick or query, was made by at least two individuals (or by a search engine plus one individual). With concatenated correlations, it is possible that no individual user (or search engine) has ever associated the original pick or query with any of output picks or queries. An indirect correlation would still require a minimum of two independent users.

In effect, concatenated correlations tend to predict what the basic correlations might look like at some future point in time where much more data has been collected. Essentially, they identify likely correlations that simply have not yet been observed.

Combinations of correlations require correlation through multiple intermediate picks or queries. The number of distinct picks and/or queries linking the original and related picks or queries is more important than how closely the intermediate picks and/or queries are linked to the original and related picks and/or queries. For a correlation, there must be at least two distinct link paths, regardless of how many users have established those links. That is, associating Q1 and Q2, via one intermediate node Q3, even if multiple users have established that association, does not constitute a correlation between Q1 and Q2.

A number of factors contribute to the strength of a correlation, including the number of link paths, the strength of each direct correlation component link, and the distinctiveness of each intermediate node. For example, linking two picks that are correlated through a common and general query (e.g., "cars") will likely result in a much weaker correlation than linking two picks via a more distinctive intermediate query like (e.g., "1965 ford mustang convertible").

The advantages of concatenated correlations may be better discerned by the following example of the concatenated correlation Query to Pick to Query (QPQ).

Table 6A and Table 6B illustrate the results of multiplying the intersecting QP scores of Tables 2A and 2B, respectively, and summing the results over the queries to determine the combined association scores. (This is not necessarily an optimal algorithm, but is used for exemplary purposes).

TABLE 6A

|  | P1 | P2 | P3 | P4 | P5 | Sum |
|---|---|---|---|---|---|---|
| Q1–Q2 | 2 × 3 | 1 × 1 | 2 × 3 | 1 × 1 | 1 × 2 | 16 |
| Q1 to Q3 | 2 × 1 | — | 2 × 1 | | 1 × 1 | 5 |
| Q2 to Q3 | 3 × 1 | — | 3 × 1 | | 2 × 1 | 8 |

TABLE 6B

|  | P3 | P5 | Sum |
|---|---|---|---|
| Q1 to Q2 | 1 × 1 | — | 1 |
| Q1 to Q3 | 1 × 1 | 1 × 1 | 2 |
| Q2 to Q3 | 1 × 1 | — | 1 |

Table 6C and Table 6D illustrate the equivalent Q2Q correlation tables for Table 6A and Table 6B, respectively.

TABLE 6C

|  | Q1 | Q2 | Q3 |
|---|---|---|---|
| Q1 | — | 16 | 5 |
| Q2 | | — | 8 |
| Q3 | | | — |

TABLE 6D

|  | Q1 | Q2 | Q3 |
|---|---|---|---|
| Q1 | — | 1 | 2 |
| Q2 | | — | 1 |
| Q3 | | | — |

As shown, the QPQ correlation results, in accordance with one embodiment of the invention, generate considerably more correlations than the narrower QRPQ correlation of a more specific alternative embodiment of the invention, and considerably more than the Q2Q correlation in accordance with still another alternative embodiment of the invention. Furthermore, using the QPQ correlation allows for providing suggestions for poorly formed queries that do not generate search results. This was not possible with the prior art schemes.

User-to-User

Just as queries and/or picks can be correlated by users, users can be correlated by queries and/or picks. The general process, which is an indirect correlation analogous to a QPQ correlation, will be referred to as a user-to-user (U2U). A U2U correlation, based upon result picks (i.e., two users have entered the same query and pick), is illustrated below in Table 7. Such a correlation would be a user-to-result pick-to-user (URPU), though there are other U2U correlations in accordance with alternative embodiments of the invention. Again, in accordance with various embodiments, a score may be assigned to each association based upon various factors. For example, assuming a time threshold, the click in row 103 is penalized due to the user spending a very short time at the URL.

TABLE 7

| Row | Timestamp | User ID | Query | Pick (URL) |
|---|---|---|---|---|
| 101 | Jan. 1, 2003 00:00:00 | U1 | Q1 | P5 |
| 102 | Jan. 1, 2003 00:01:00 | | Q2 | P1 |
| 103 | Jan. 1, 2003 00:02:00 | | | P2 |
| 104 | Jan. 1, 2003 00:02:05 | | | P3 |
| 201 | Jan. 2, 2003 00:00:00 | U2 | Q2 | P4 |
| 202 | Jan. 2, 2003 00:01:00 | | | P1 |
| 203 | Jan. 2, 2003 00:02:00 | | | P4 |
| 204 | Jan. 2, 2003 00:04:00 | | Q1 | P2 |
| 205 | Jan. 2, 2003 00:04:05 | | | P3 |
| 301 | Jan. 3, 2003 00:00:00 | U3 | Q3 | P3 |
| 302 | Jan. 3, 2003 00:04:00 | | Q2 | P1 |
| 303 | Jan. 3, 2003 02:00:00 | | Q3 | P5 |
| 401 | Jan. 4, 2003 00:00:00 | U2 | Q1 | * |
| 402 | Jan. 4, 2003 00:06:00 | | Q2 | P4 |

Table 7A illustrates a tabulation of the click information contained in Table 7 in accordance with an embodiment of the invention.

TABLE 7A

|  | U1 | U2 | U3 |
|---|---|---|---|
| Q1P2 | — | 1 | — |
| Q1P3 | — | 1 | — |
| Q1P5 | 1 | — | — |
| Q2P1 | 1 | 1 | 1 |
| Q2P2 | | | |
| Q2P3 | 1 | 1 | |
| Q2P4 | | 1 | |
| Q3P3 | | | 1 |
| Q3P5 | | | 1 |

In accordance with one embodiment of the invention, the affinity of a given user (e.g., U1) toward another user (e.g., U2) may be defined as the number of queries/picks the user shares with another, divided by the total number of queries/picks of the given user (i.e., Affinity$_{U1\text{-}U2}$=(shared QP$_{U1\text{-}U2}$)/(total QP$_{U1}$). For alternative embodiments of the invention, more sophisticated affinity algorithms may be used. For example, an affinity algorithm, in accordance with one embodiment, might account for differences in frequency of search and award different weights to queries, picks, and query-picks.

Table 7B illustrates the calculated affinity information for the tabulated click information of Table 7A.

TABLE 7B

|  | To U1 | To U2 | To U3 |
|---|---|---|---|
| U1 | 1 | 0.67 | 0.33 |
| U2 | 0.40 | 1 | 0.20 |
| U3 | 0.33 | 0.33 | 1 |

Using such affinity information, when subsequently generating results for a future query issued by a given user, the pick scores for corresponding users are adjusted according to the affinity information. For example, results for a future query of user U1, would adjust scores for picks generated by user U2 by a function of (0.67) and scores for picks generated by user U3 by a function of (0.33). Picks generated by a user that had no affinity would be assigned some default value.

Exemplary Applications

The methods and systems for organizing and presenting data discussed above, in reference to various alternative embodiments of the invention, may be used for many practical applications as will be obvious to those skilled in the art. A number of such applications will be discussed, more fully, below. The use of particular USE activity information and/or user information may be more suitable to particular applications than others. For example, for a particular application, it may be more practical, more efficient, or more accurate, to correlate particular USE activity. The following exemplary applications will be discussed in terms of the USE activity information and/or user information that is well suited to a practical implementation of the particular application.

Exemplary Q2P Applications

Embodiments of the invention that correlate the Q2P and/or Q2P-equivalent combination USE activity information allow a user to obtain more relevant search results in a number of ways. For example, a user may refine a search and associate some portion of the revised results with the original search. That is, picked documents need not have a textual relationship to the original search, but only a conceptual relationship. The conceptual relationship may provide a better response to the original search. Search results based upon a correlation of Q2P USE activity information circumvents the limitation of text-based retrieval found in the prior art schemes. Embodiments of the invention have the capability to preserve and exploit the user research process. This capability can be used to effect systems with a number of distinct advantages over prior art schemes.

The correlation of Q2P USE activity information for a number of independent users, in accordance with various embodiments of the invention, takes advantage not only of the relevance judgments of previous users, but of their research efforts as well. Subsequent users need not reiterate the mistakes of previous users; instead, subsequent users benefit from the trial-and-error learning of previous users.

Figure 5:
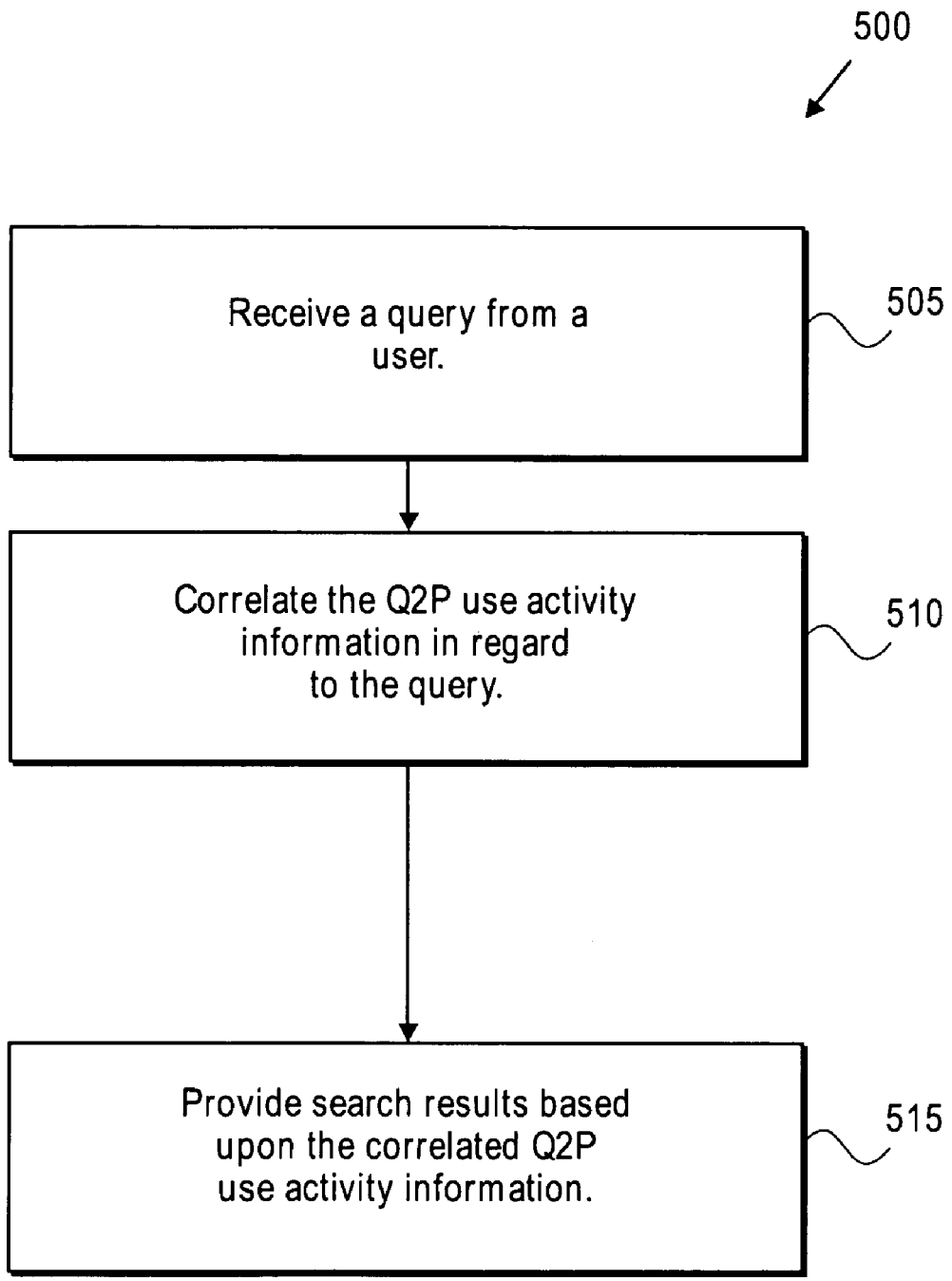
FIG. 5 is a flow chart that illustrates a process for providing more relevant search results in accordance with one embodiment of the invention.

FIG. 5 illustrates a process for providing more relevant search results in accordance with one embodiment of the invention. Process 500, shown in FIG. 5, begins at operation 505 in which a query is received from a user. Such a query may have one or more particular characteristics, which, once discerned, may be the basis for providing more relevant search results in accordance with various alternative embodiments of the invention.

At operation 510, the Q2P USE activity information for a number of users is correlated in regard to the received query. Each query may have various particular characteristics that may be determined through correlation of Q2P USE activity information. These particular characteristics may include, for example, the following: the query may be subject to different meanings for different users, the query may be misspelled, the query may have equivalent phrasings, the query may have more relevant portions and less relevant portions, the query may be associated with a specific result product or result product mix, and the query may be subject to broader or narrower search results. Each of these characteristics, as well as others, alone or in combination, may be useful in providing more relevant search results under different circumstances.

At operation 515, search results, based upon the correlated Q2P USE activity information, are provided to the user in response to the query. The search results provided may be based upon one or more characteristics of the query. For example, where it is determined that the query has different meanings, results based upon a more popular meaning may be provided in response to the query.

Several examples of results obtained by process 500 in comparison to results obtained through typical prior art methods are shown below in relation to the particular characteristics of queries discussed above.

Table 8 illustrates exemplary search results for several queries having more than one meaning. As shown, embodiments of the invention allow the search results to relate to the more popular meaning of the particular query in comparison to a typical prior art scheme.

TABLE 8

| | Dominant interpretation | |
|---|---|---|
| Example query | Exemplary Embodiment | Prior Art Scheme |
| "buffalo" | Most users seek the animal (and often enter the subsequent query "bison" in order to find more relevant results.) | All the top results concern Buffalo, NY. |
| "holes" | Most users seek the book or recent movie Holes. | All the top results concern "black holes." |
| "windows" | A large fraction of users seek glass windows. | All the top results concern Microsoft Windows. |
| "parties" | A large fraction of users seek party planning or supplies. | All the top results concern political parties. |

Table 9 illustrates exemplary search results for a misspelled query (e.g., "encycopidea"). As shown, embodiments of the invention allow the search results to relate to the probable correctly spelled query. In this way, embodiments of the invention can determine the correct spelling for a misspelled query. Prior art schemes typically produce no search results, or poor search results, for such misspellings.

TABLE 9

| | Dominant interpretation | |
|---|---|---|
| Example query | Exemplary Embodiment | Prior art scheme |
| "encycopidea" | 1. www.brittanica.com<br>2. www.encyclopedia.com | Issues no results, just a spelling suggestion to try "Encyclopedia." |

For one embodiment of the invention, such a spelling correction is a "soft" correction. That is, in accordance with one embodiment of the invention, the results provided in response to the query are the results that were preferred by a majority of the users who entered the exact query. If most users consider the query a misspelling, then many results will contain the corrected query. If most users consider the query intentional, then most results will contain the query unchanged. If both interpretations are legitimate, the results may be a combination. For such embodiments, it becomes highly unlikely that an erroneous spelling correction will be provided because all corrections are conceptually relevant, not just textually similar.

In contrast, prior art spelling corrections are typically "hard" corrections. That is, such schemes identify a misspelled query, attempt to correct it and then search for results based upon the correction. Such schemes provide irrelevant results where legitimate queries are misdiagnosed as misspelled, or if the query is in fact misspelled, but the algorithmic correction was also not the intended query. An "active" correction would require a user to click a link to search again on a suggested query, which again might be an erroneous correction.

Table 10 illustrates exemplary search results for a query having two or more representations or equivalent phrasings (e.g., "Burma and Myanmar"). As shown, embodiments of the invention provide search results for each equivalent phrasing with a high degree of commonality. For the example provided, five of the top nine search result URLs are common to each of the equivalent phrasings. This is much higher similarity than prior art schemes.

TABLE 10

Exemplary Embodiment

| Example query: "burma history" | Example query: "myanmar history" |
|---|---|
| 1. www.travel-burma.com/history.html | 1. www.hartford-hwp.com/archives/54/index-b.html |
| 2. www.hartford-hwp.com/archives/54/index-b.html | 2. www.myanmars.net/history/ |
| 3. www.asiatour.com/myanmar/e-01land/em-lan43.htm | 3. www.travel-burma.com/history.html |
| 4. rubens.anu.edu.au/student.projects/offerings/burma.2.html | 4. rubens.anu.edu.au/student.projects/offerings/burma.2.html |
| 5. www.nationbynation.com/Burma/History1.html | 5. www.asiatour.com/myanmar/e-01land/em-lan46.htm |
| 6. www.louisville.edu/library/ekstrom/govpubs/international/burma/burmahistory.html | 6. www.myanmar.com/ |
| | 7. www.odci.gov/cia/publications/factbook/geos/bm.html |
| | 8. www.myanmars.net/ |
| 7. www.myanmars.net/ | 9. www.asiatour.com/myanmar/e-01land/em-lan43.htm |
| 8. asiatours.net/burma/info/history.html | |
| 9. pilger.carlton.com/burma | |

Users often include keywords that add little relevant information to a query, yet impose unnecessary text-matching requirements on the search engine that result in less relevant search results for prior art schemes. Embodiments of the invention overcome this disadvantage.

Table 11 illustrates exemplary search results for a query including a redundant portion. As shown, embodiments of the invention allow redundant, non-essential, and non-relevant portions of the query to be ignored, where doing so provides a more relevant, simpler query.

TABLE 11

| | Rank of expected #1 result | |
|---|---|---|
| Example query | Exemplary Embodiment | Prior Art Scheme |
| "columbus blue jackets" | 1 | 1 |
| "columbus ohio blue jackets" | 1 | Not in top 100 |

In accordance with one embodiment of the invention, search result picks on various result products (e.g., graphics, audio/video, text, images, news items, etc.) are treated equally. That is, users need not specify which type of result they are seeking. Results issued can reflect prior preferences exhibited by the user or the preferences of previous independent users. For example, if a query precipitates an image search so frequently that a particular image is the highest scoring pick, that image may be provided as a search result in accordance with its score. For one embodiment, the various top-scoring results of different result products need not be interleaved in score order, but may be grouped by product for presentation. For one such embodiment, the result products the user seeks are identified without the need to decipher the query with language tools in an attempt to ascertain the user's objectives.

Table 12 ilustrates exemplary search results for a query resulting in a search result product mix (e.g., including graphics results). As shown, embodiments of the invention allow search results that include a product mix.

TABLE 12

| Example query | Exemplary Embodiment search results |
|---|---|
| "who is homer simpson?" | 1. www.simpsons100.com |
| | 2. www.thesimpsons.com |
| | 3. www.snpp.com |
| | 4. members.aol.com/jynelms/tv/simpsons.html |
| | 5. |
| | 6. www.newspringfield.com |

Embodiments of the invention provide the ability to vary the breadth of the search results by adjusting the weighting of the Q2P vs. Q2RP pick scores. Table 13 illustrates narrow and broad search results for the query. "stanford".

TABLE 13

| Example query | Q2RP/Q2P = 1 | Q2RP/Q2P = 0 |
|---|---|---|
| "stanford" | www.stanford.edu | www.harvard.edu |
| | www-cs.stanford.edu | www.yale.edu |
| | www.gostanford.com | www.berkeley.edu |
| | www-med.stanford.edu | www.princeton.edu |
| | www-sul.stanford.edu | www.ucla.edu |

Column 1 of Table 13 contains narrow results related to picks on the query. Column 2 of Table 13 shows broad results (e.g., only picks that were not made in response to the results of the original query are shown). The column 2 results represent the broad scope of the query topic, whereas the column 1 results help the user explore the depth of the query topic. Practically, a combination of the narrow and broad results may provide the most relevant search results. For one embodiment of the invention, a number of combinations having varying breadths are created, allowing the user to select a "broaden the results" or "focus the results" link, or vary a control to adjust the mixture.

Exemplary Q2Q Applications

Figure 6:
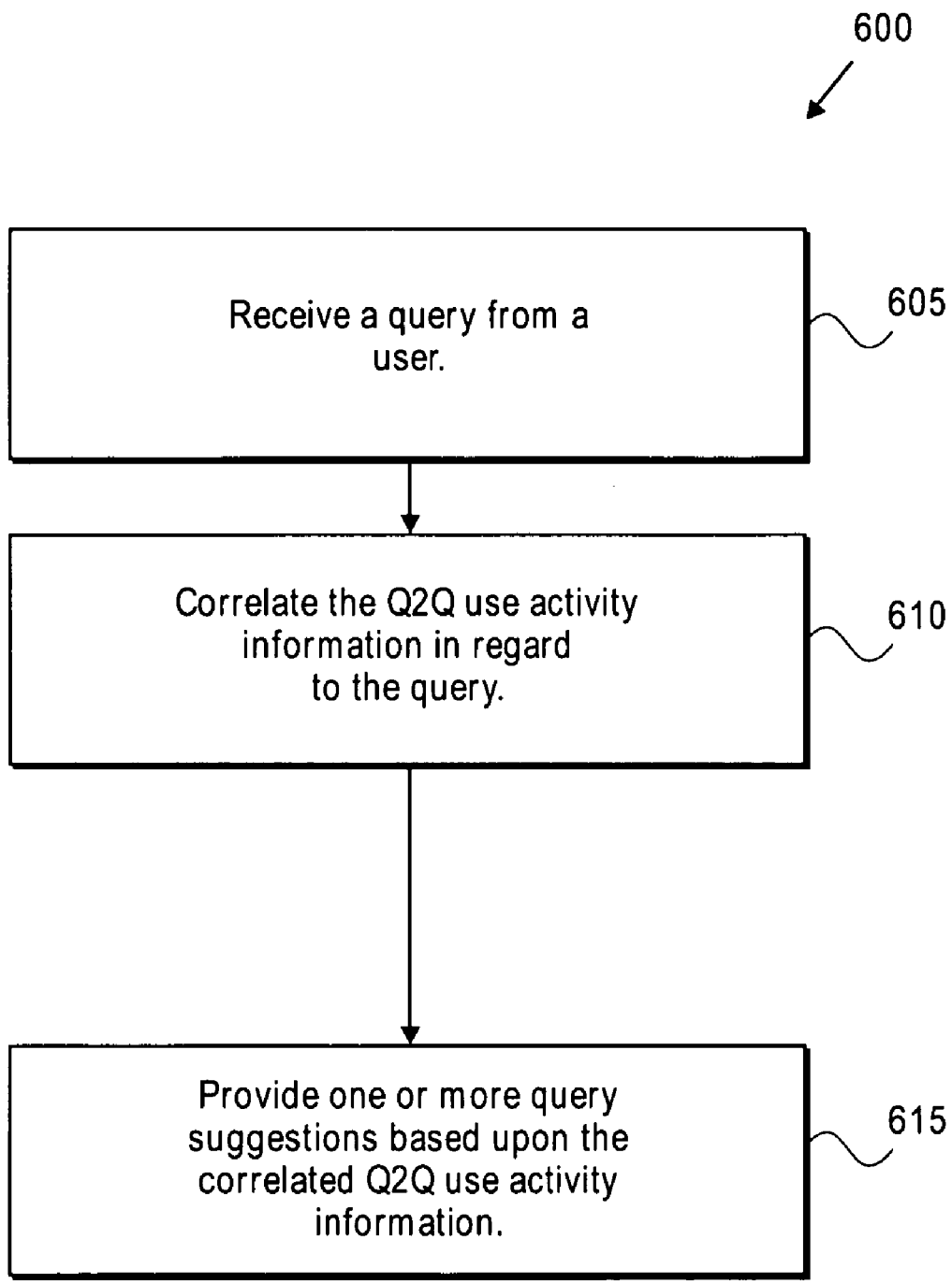
FIG. 6 is a flow chart that illustrates a process for providing relevant query suggestions in accordance with one embodiment of the invention.

One embodiment of the invention that correlates the Q2Q and/or Q2Q-equivalent combination USE activity information allows users to obtain suggested queries relevant to their search. FIG. 6 illustrates a process for providing relevant query suggestions in accordance with one embodiment of the invention. Process 600, shown in FIG. 6, begins at operation 605 in which a query is received from a user.

At operation 610, the Q2Q (and/or Q2Q-equivalent combination) USE activity information is correlated. Correlating the Q2Q USE activity information directly tends to produce results that are predominantly refinements of the query. Correlating Q2Q-equivalent combination USE activity information tends to produce results that are more diverse, although there is typically a high degree of overlap. For one embodiment of the invention, Q2Q-equivalent combination USE activity information is correlated for a relative obscure original query, because such a correlation often produces considerably more query suggestions.

Table 14 illustrates query suggestions provided in response to the original query, "electronic eavesdropping devices," in accordance with one embodiment of the invention. Column 1 of Table 14 contains query suggestions based upon the correlation of Q2Q USE activity information directly, while column 2 of Table 14 contains query suggestions based upon the correlation of Q2Q equivalent combination (i.e., QPQ) USE activity information.

TABLE 14

| Example query | Direct (Q2Q) | Indirect (QPQ) |
|---|---|---|
| "electronic eavesdropping devices" | electronic eavesdropping what is electronic eavesdropping devices? | electronic eavesdropping eavesdropping devices eavesdropping eavesdropping technology why do we need electronic eavesdropping? where can I find detective devices? free keystroke recorders electronic surveillance countermeasures spystuff fm eavesdropping devices |

At operation 615, one or more query suggestions, based upon the correlated Q2Q (and/or Q2Q-equivalent combination) USE activity information, are provided to the user. For one embodiment of the invention, query suggestions may be presented on the result page. Alternatively or additionally, a link may be provided to a page of query suggestions. Such an embodiment may be practical where an original query results in a large number of highly relevant (e.g., high scoring) query suggestions. For one embodiment of the invention, query suggestions can be sorted into refinements (containing all the original search terms) and related searches, prior to presentation.

In accordance with one embodiment of the invention, correlation of Q2Q (and/or Q2Q-equivalent combination) USE activity information, is used to effect an active query spelling correction scheme. An active query spelling correction scheme is one in which the user selects a suggested query correction to obtain search results based upon the query correction.

Figure 6A:
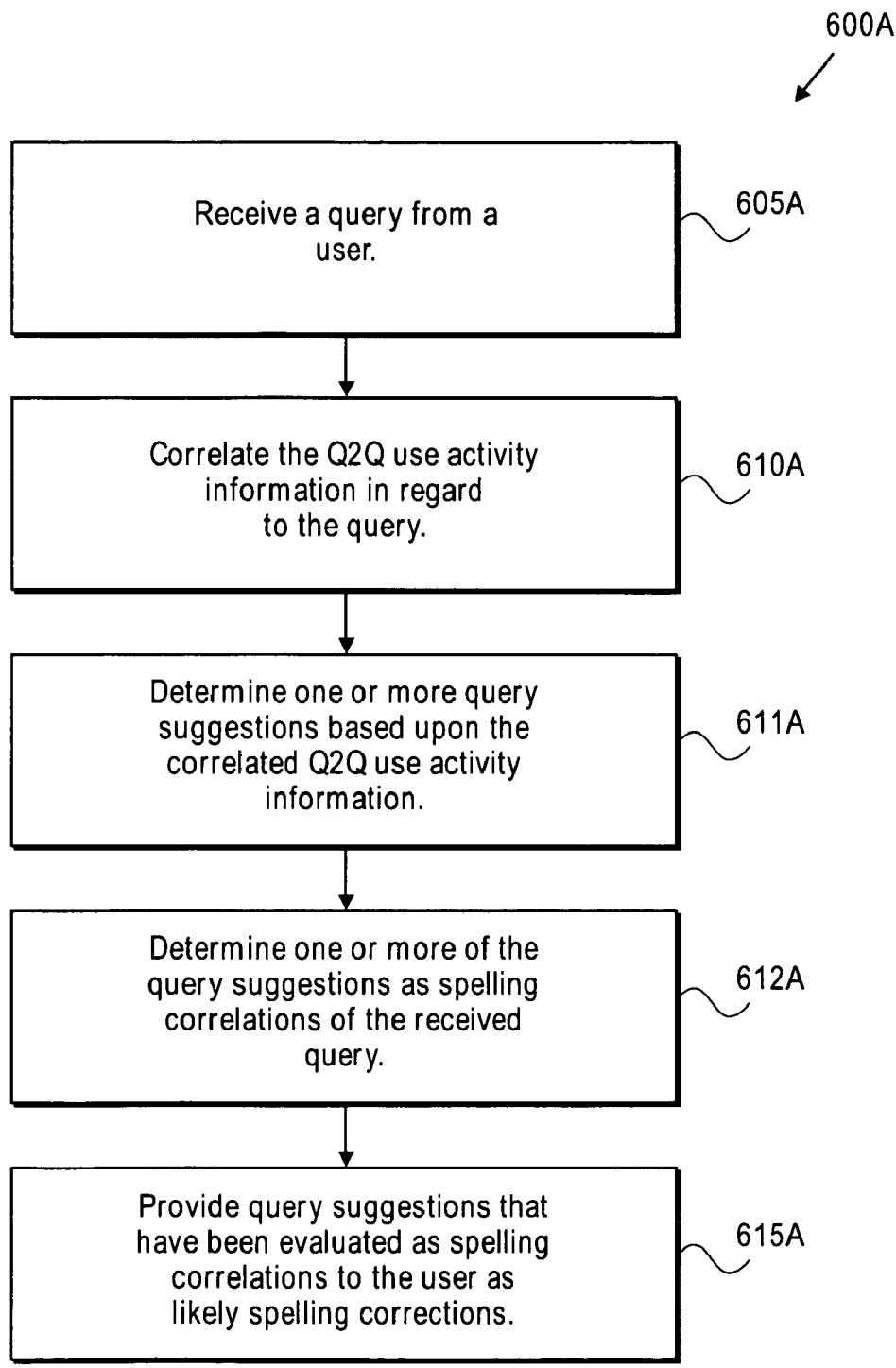
FIG. 6A is a flow chart that illustrates a process for providing query spelling correction suggestions in accordance with one embodiment of the invention.

FIG. 6A illustrates a process for providing query spelling correction suggestions in accordance with one embodiment of the invention. Process 600A, shown in FIG. 6A, begins at operation 605A in which a query is received from a user. Such a query may be a misspelling of the user's intended query.

At operation 610A, the Q2Q (and/or Q2Q-equivalent combination) USE activity information is correlated, as discussed above, in reference to operation 610 of process 600.

At operation 611A, one or more query suggestions are determined based upon the correlated Q2Q (and/or Q2Q-equivalent combination) USE activity information.

At operation 612A, one or more of the query suggestions are determined as spelling corrections of the original query (i.e., the query received at operation 605A). In accordance with alternative embodiments of the invention, the determination of the query suggestion is effected in various different manners depending upon the query received. For example, for previously observed queries, where Q2Q information exists, conceptually related queries that are also textually similar can be identified using the Q2Q correlation information and an edit distance computation algorithm. In such a case, various criteria may be used to effect the determination of a query suggestion as a spelling correction of the original (i.e., received) query. For example, where the determined query suggestion is correlated to the received query, textually similar to the received query, and more common than the received query, the determined query suggestion may be determined as a spelling correction of the received query. For alternative embodiments, more criteria may be considered to bolster confidence in the determination of the query suggestion as a spelling correction of the received query. For example, where the query suggestion tends to be issued subsequent to the received query more often than prior to the received query or where the query suggestion tends to result in more user picks than the received query, these criteria would bolster confidence in the determination of the query suggestion as a spelling correction of the received query.

Where the query received at operation 605A is a previously unobserved query, then no Q2Q information exists. In such cases, in accordance with one embodiment of the invention, if a word in a query is suspected of being an error, it is evaluated in one of two ways depending upon whether or not the suspect word has been previously observed or not.

Where the suspect word has been previously observed, then other queries in which the word appears are identified. These queries are weighted based on keywords in common with the received query. Finally, previously considered corrections of the suspect word are examined and used to provide a suggested correction based on the frequency of such previously suggested corrections and keyword weighting of the queries in which the suspect word appears.

Where the suspect word has not been previously observed, other queries in which all the other keywords in the received query appear can be identified. For one such embodiment of the invention, where there are no queries that meet this criteria, the queries with the most distinctive (low frequency) words in common with the received query can be identified. For either embodiment, the identified queries can be weighted based on textual similarity with the received query and the most common query with high textual similarity to the received query identified.

For one embodiment of the invention, where conditions do not permit use of the method spelling correction suggestion process described above, the correlated Q2Q USE activity information is used in conjunction with a conventional n-gram-type model. In such an embodiment, word association frequencies are extracted from the query frequency data to determine the common partners for known keywords or phrases. This data, in combination with edit distance, is used to determine a query as a likely spelling correction suggestion for an unknown word in a multi-word query.

At operation 615A, one or more query suggestions that have been determined as a spelling correction of the received query, are provided to the user as likely spelling corrections of the received query. For one embodiment of the invention, where no query suggestion is determined as a likely spelling correction of the received query, the query suggestions are presented as described above in operation 615 of process 600 in reference to FIG. 6.

Exemplary P2Q Application

In accordance with one embodiment of the invention, suggested queries related to a particular result page can be provided using P2Q or a P2Q-equivalent combination.

Figure 7:
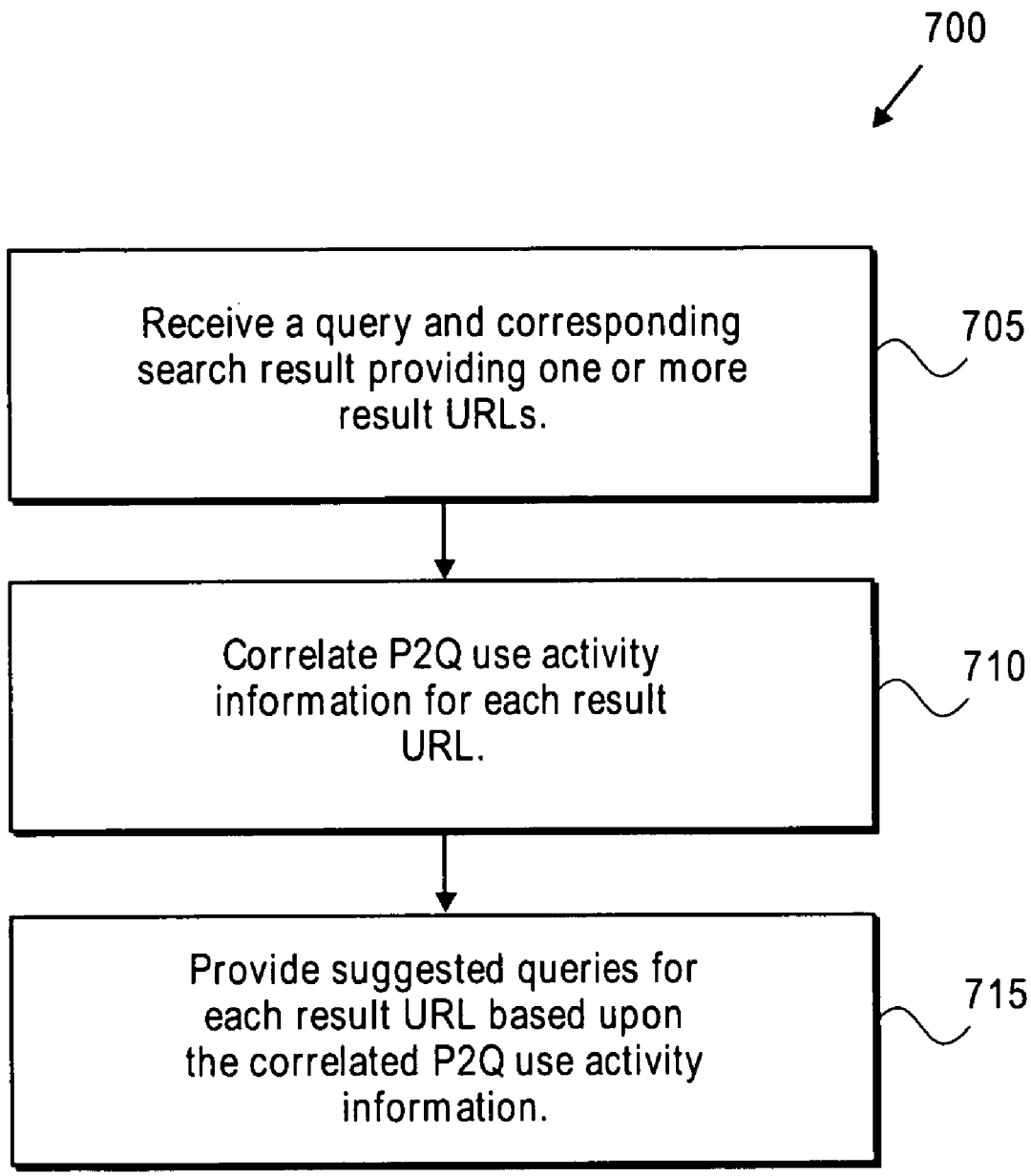
FIG. 7 is a flow chart that illustrates a process in which suggested queries are provided in accordance with one embodiment of the invention.

FIG. 7 illustrates a process in which suggested queries are provided in accordance with one embodiment of the invention. Process 700, shown in FIG. 7, begins at operation 705 in which a query and corresponding search result, providing a number of result URLs, is received.

At operation 710, the P2Q (or P2Q-equivalent combination) USE activity information is correlated for each result URL.

At operation 715, suggested queries are provided for each result URL based upon the correlated P2Q USE activity information. That is, a list of suggested queries that are closely related to any of the pages among the search results is provided. Such suggestions would, in the case of ambiguous queries, provide a user with a focused meaning that may be embodied by one of the URLs, but not others.

Table 15 illustrates an exemplary search result page for the query "rangers" and exemplary corresponding suggested queries in accordance with one embodiment of the invention.

TABLE 15

| Result page | Suggested queries |
|---|---|
| www.rangers.co.uk | glasgow rangers |
| | rangers football club |
| | rangers football |
| www.specialoperations.com | army delta force |
| | special forces |
| | airborne rangers |
| www.newyorkrangers.com | new york rangers |
| | rangers logo |
| | where can I find info |
| | on the rangers? |
| www.ford-trucks.com | 1987 ford ranger |
| | ford truck pictures |
| rangers.mlb.com/NASApp/mlb/tex/homepage/tex_homepage.jsp | mlb rangers |
| | texas rangers baseball |
| | texas rangers |

Exemplary P2P Applications

In accordance with one embodiment of the invention, one or more results that are similar to a particular result, provided in response to a received query, are provided using P2P or a P2P-equivalent combination. For example, a query is received and a result corresponding to the query is evaluated. Based upon the evaluation, similar results are also provided. That is, for example, a few related pages could be specified along with the result and/or a link could lead to a new result page with additional similar results. Typically, similar results for an image will yield mostly other images, similar results for a web page will yield mostly other web pages, etc.

Figure 8:
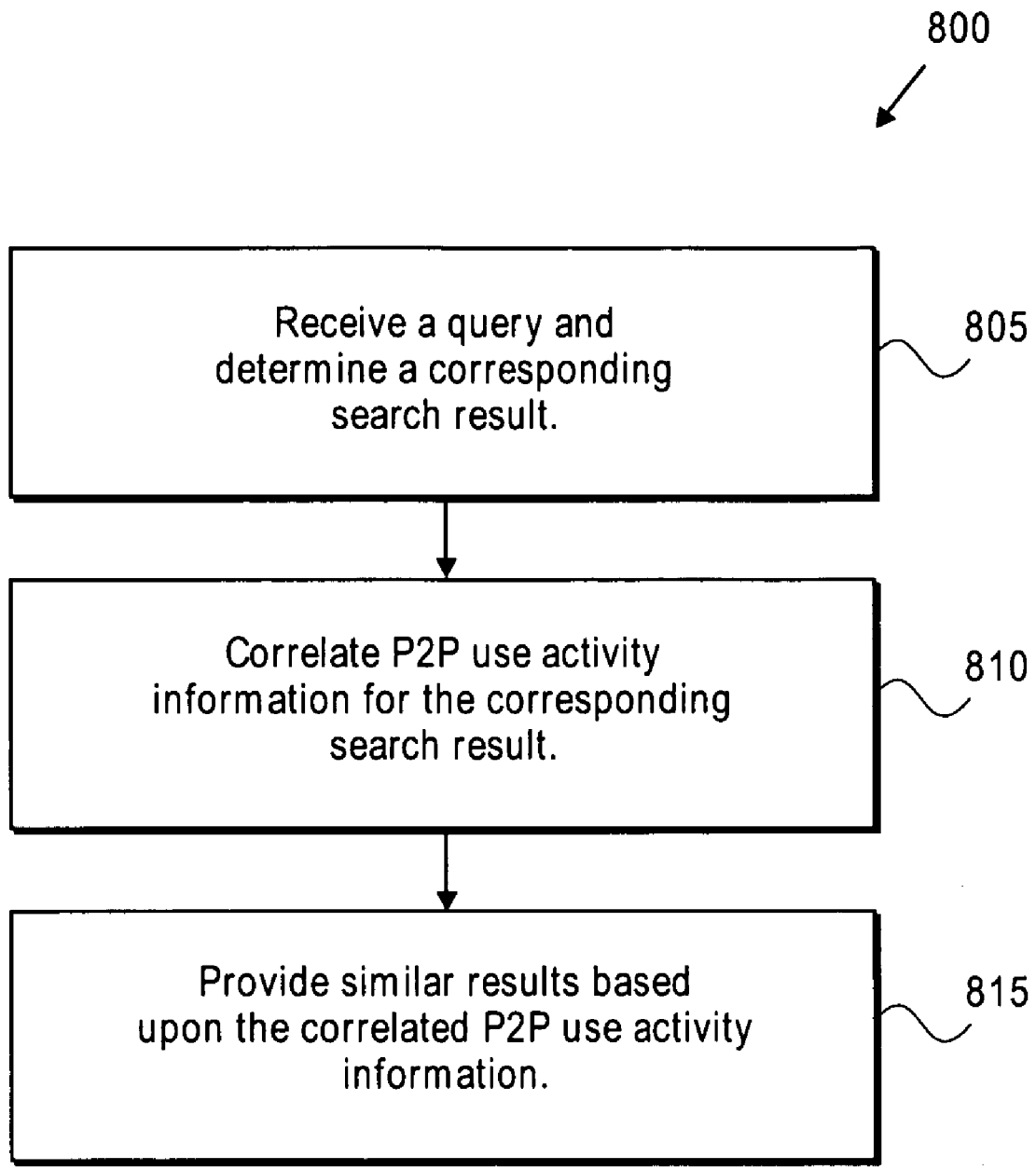
FIG. 8 is a flow chart that illustrates a process in which similar results are provided in accordance with one embodiment of the invention.

FIG. 8 illustrates a process in which similar results are provided in accordance with one embodiment of the invention. Process 800, shown in FIG. 8, begins at operation 805 in which a query is received and a corresponding search result determined.

At operation 810, the P2P (or P2P-equivalent combination) USE activity information is correlated for the corresponding search result.

At operation 815, one or more similar results (i.e., similar to the received result) are provided based upon the correlated P2P USE activity information. That is, a list of results that are closely related to the received result is provided. Similar results can constitute search picks, images, news items, etc.

Table 16 illustrates exemplary similar results for a result provided in response to the query "phoenix" in accordance with one embodiment of the invention.

TABLE 16

| Result | Top similar results |
|---|---|
| www.ci.phoenix.az.us | www.azcentral.com |
| | www.phoenixcvb.com |

TABLE 16-continued

| Result | Top similar results |
|---|---|
| | www.arizonaguide.com |
| | www.go-arizona.com/phoenix |
| | www.state.az.us |
|  |   |

Exemplary User Information Applications Personalized Search

The concept of personalized searches is based on the premise that more relevant search results can be provided if something is known about the user. The recommendations of users who have shared at least some of a particular user's interests and opinions in the past are deemed to be of greater value than the recommendations of users, who have never shown evidence of sharing his interests and tastes.

Prior art personalized search schemes typically identify the demographic of a user, then tailor the results to the preferences of other members of the demographic community. This approach has serious drawbacks in that preferences vary widely within a demographic community. Each user is typically a member of many, often difficult to reconcile, demographic communities, and users are typically not forthcoming with reliable demographic information.

In accordance with one embodiment of the invention, each user is viewed as a community of one, with a degree of affinity to other users.

Figure 9:
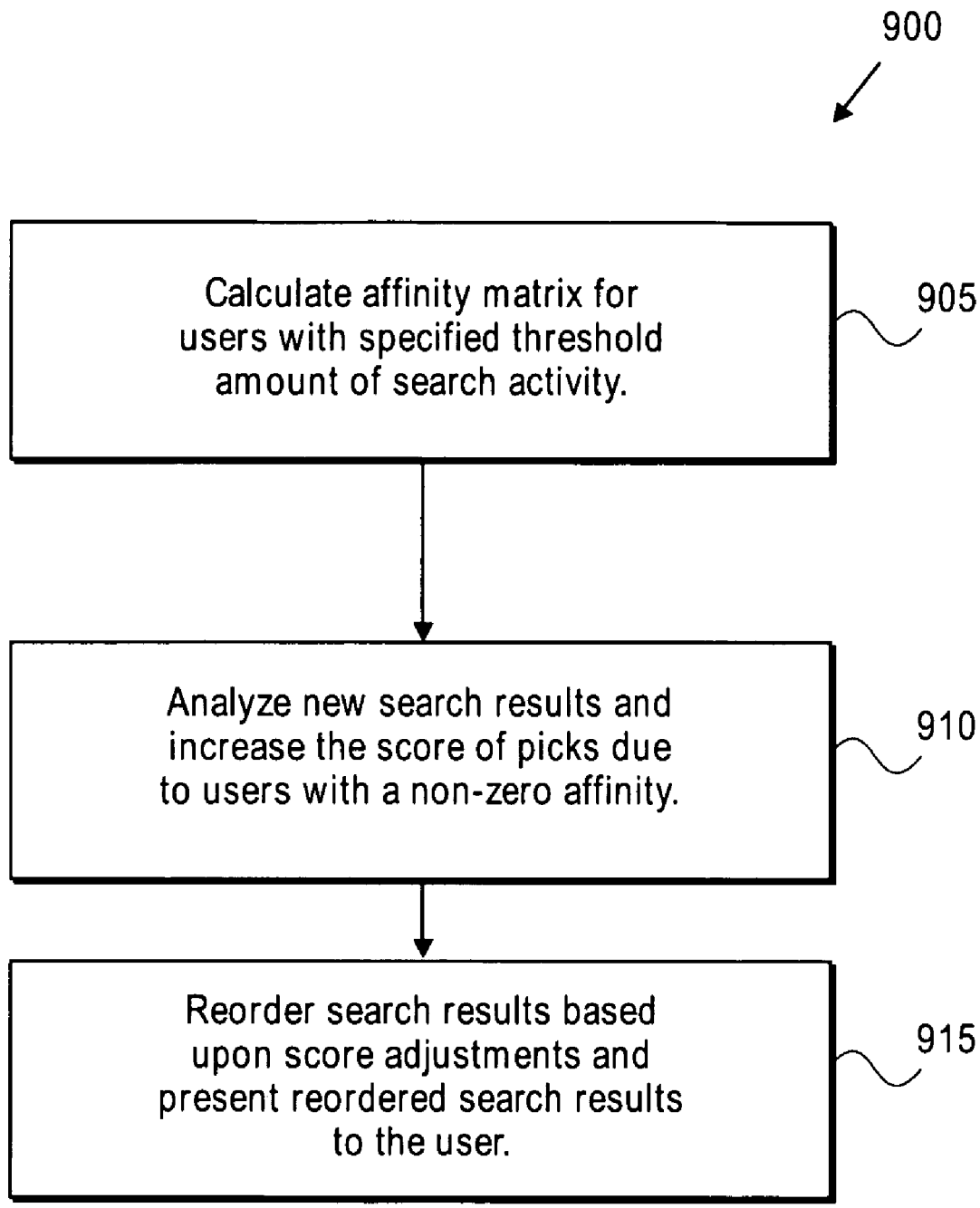
FIG. 9 is a flow chart that illustrates a process in which information is correlated to provide more relevant search results in accordance with one embodiment of the invention.

FIG. 9 illustrates a process in which U2U information is correlated to provide more relevant search results in accordance with one embodiment of the invention. Process 900, shown in FIG. 9, begins at operation 905 in which an affinity matrix is calculated for every user who demonstrates at least a minimum amount of search activity. Calculation of such a matrix could proceed as follows for one embodiment of the invention. First, all queries and picks by a given user, U1, are extracted. Then users, U2, that duplicated at least N of U1's queries and/or picks are identified, and U2's remaining queries and picks are identified. Then weights are assigned to each query and pick and an affinity score calculated. The weights may be inversely proportional to how common among all users that query and/or pick was, and the affinity score is calculated from a comparison of the weighted picks/queries in common with the total weighted picks/queries.

At operation 910, the search results, resulting from a new query of U1, are analyzed, and the score of each result is increased if any previous picks were due to users with a non-zero affinity score.

At operation 915, the results are reordered based upon the score adjustments of operation 910 and the reordered results are presented to the user.

In accordance with an alternative embodiment, a process similar to process 900 can be used to increase the relevancy of search suggestions.

Localized Search

One important type of user information is location. Location has the advantage over other demographic information, in that it does not require self-reporting by the user and holds true no matter who is using the computer.

For one embodiment of the invention, user information includes geo-location information for users and, by extension, their queries and picks. The geo-location information may include latitude and longitude as well as city, state and country name. In accordance with one embodiment, such user information is used to provide search results based upon a user's geographic location. For example, a US user entering the query "osu" might reasonably mean "Ohio State University", "Oklahoma State University" or "Oregon State University." The search results provided are based upon user location (e.g., a user in Oregon is provided with "Oregon State University"). For one embodiment, the search results provided are also correlated with users having similar user information (e.g., similar location).

Figure 10:
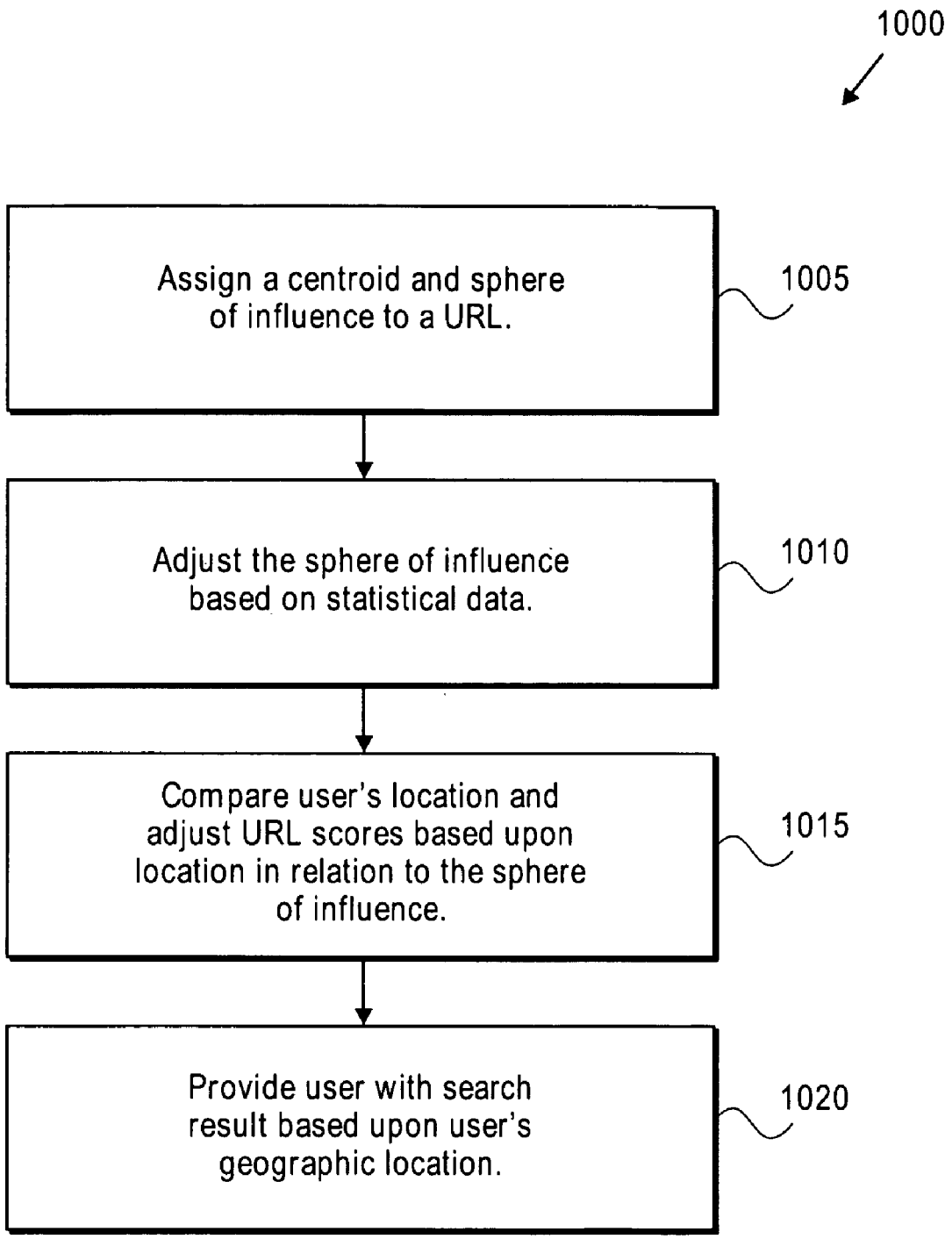
FIG. 10 is a flow chart that illustrates a process by which more relevant search results are provided to a user based upon the user's location in relation to a location associated with a pick in accordance with one embodiment of the invention.

FIG. 10 illustrates a process by which more relevant search results are provided to a user based upon the user's location in relation to a location associated with a pick in accordance with one embodiment of the invention. Process 1000, shown in FIG. 10, begins at operation 1005 in which a URL that has acquired more than a specified number of picks is assigned a latitude-longitude "centroid" and a "sphere of influence." The centroid is the position where some function of the sum of the distances to each of the statistically significant logged user-picks is minimized. For example, for one embodiment, the centroid will represent the location of the actual brick-and-mortar incarnation of the URL (the URL exhibiting local bias) to a high degree of accuracy. Where no local bias exists, the centroid location has little or no meaning. For example, a URL without a brick-and-mortar incarnation may exhibit no local bias on the national scale.

The sphere of influence is a geographic radius within which the URL is expected to be highly appealing to users and outside of which it is expected to be largely unappealing. The smaller the radius, the steeper the drop-off in appeal—or the more "localized" the appeal. The radius of the sphere of influence is inversely proportional to some measure of local bias. For example, a highly localized URL like www.canariesbaseball.com forms a very tight sphere of influence centered on Sioux Falls, S. Dak. (i.e., the hometown of the Sioux Falls Canaries).

At operation 1010, the sphere of influence is adjusted based upon statistical data. For example, some locations generate many more clicks than other locations. Raw click score data is adjusted to reflect the disparity.

At operation 1015, the user's geographic location is compared with a set of pre-computed location data for responses to a particular query and the search result scores are adjusted based upon the geographic location of the user. The scores of those URLs that are nearby and have a high degree of localization are increased, while the scores of distant URLs are decreased (scores of URLs without much localization bias are left unchanged).

At operation 1020, the user is provided with search results that are based, at least in-part, upon the geographic location of the user. This will allow users to receive subjectively relevant results within the initial several results. For example, in contrast to prior art schemes, a user in Wyoming who enters "state tax forms" will be provided with state tax forms for Wyoming more readily.

Localization by User

Localization can be based on picks, as was described above, or can be based on the user in accordance with alternative embodiments. For one embodiment of the invention, localization based upon the user allows results for popular queries to be cached by jurisdiction and then issued to users based on location without any real-time calculations.

Figure 11:
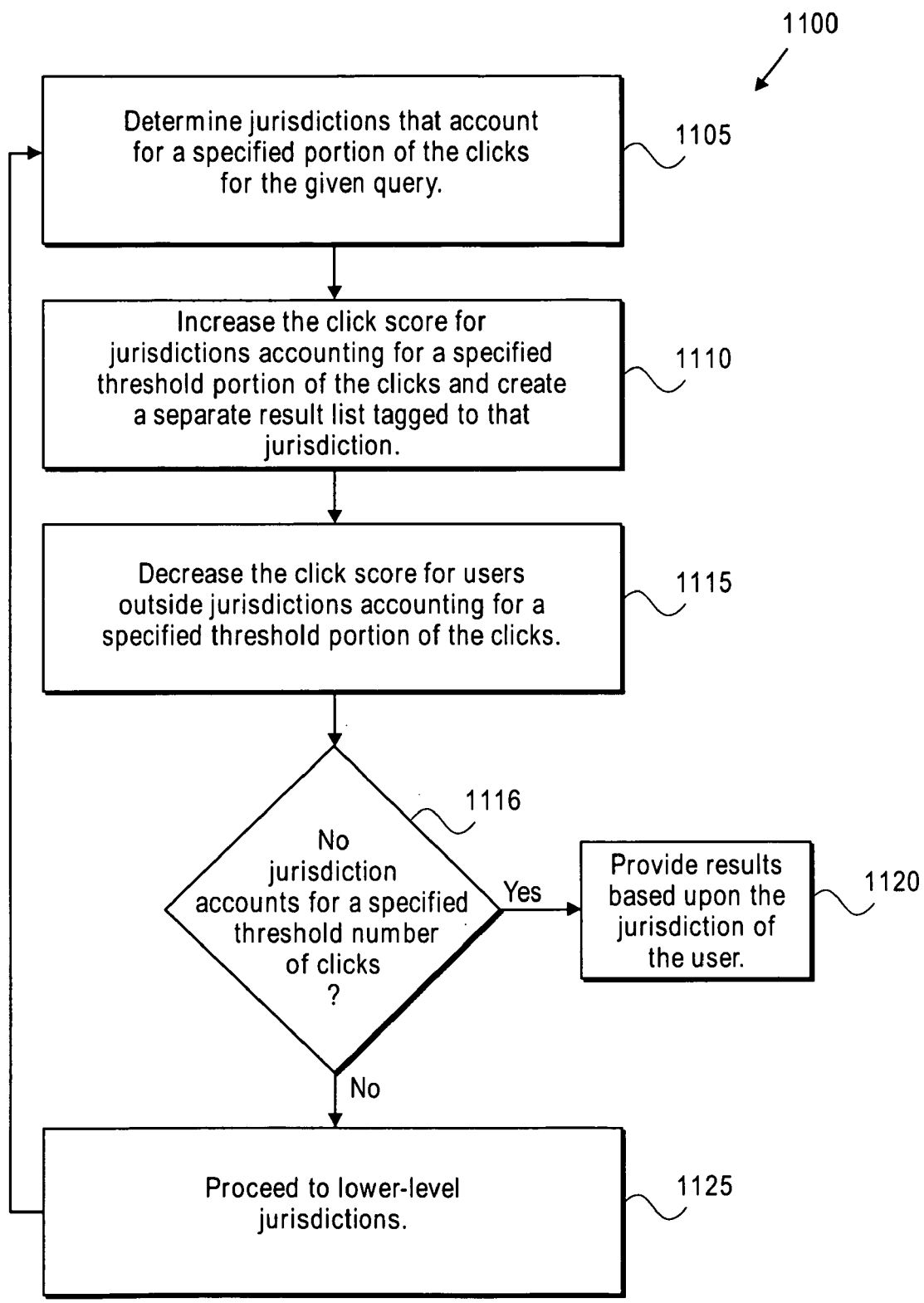
FIG. 11 is a flow chart that illustrates a process by which more relevant search results are provided to a user based upon the user's location in accordance with one embodiment of the invention.

FIG. 11 illustrates a process by which more relevant search results are provided to a user based upon the user's location in accordance with one embodiment of the invention. Process 1100, shown in FIG. 11, begins at operation 1105 in which jurisdictions that account for a specified portion of the clicks for a given query are determined, starting with the highest-level jurisdictions. For example, the query "car insurance" yields a mix of US and UK sites, with a majority of clicks on the UK sites from users located in the UK and a majority of clicks on the US sites from users located in the US.

At operation 1110, the click score for jurisdictions accounting for a specified threshold portion of the clicks is increased, and a separate result list, tagged to that jurisdiction, is created.

At operation 1115, the click scores for users outside of that jurisdiction are decreased, creating a general list for users outside the jurisdictions that account for a specified threshold portion of the clicks. In an alternative embodiment, real-time blended lists are created based on user proximity to special jurisdictions.

At operation 1116, if no jurisdictions account for a specified threshold portion of the clicks, then the results are provided based upon the jurisdiction of the user at operation 1120.

If, at operation 1116, there still exist jurisdictions that account for a specified threshold portion of the clicks, then the process is reiterated by proceeding to lower level jurisdictions at operation 1125, and from there, to operation 1105.

For an alternative embodiment, the locations are correlated with the URLs, regardless of query. This has significant statistical advantages because it aggregates more data. For example, the origins of all users who picked a particular state tax site for any query are considered, the particular site is then given extra weight for users in the most prominent state regardless of the query involved. The potential disadvantage occurs if a Wyoming user enters "Florida tax forms." If the Wyoming state tax site is among the results, its score will get a significant and unwarranted increase.

General Matters

Embodiments of the invention provide methods and systems for conceptually organizing and presenting information in which a correlation of users' responses to the organization and presentation of information is used to determine an optimal organization and presentation of the information. Though described above in terms of several exemplary embodiments, many additional applications exist for alternative embodiments of the invention.

The invention includes various operations. Many of the methods are described in their most basic form, but operations can be added to or deleted from any of the methods without departing from the basic scope of the invention. The operations of the invention may be performed by hardware components or may be embodied in machine-executable instructions as described above. Alternatively, the steps may be performed by a combination of hardware and software. The invention may be provided as a computer program product that may include a machine-readable medium having stored thereon instructions, which may be used to program a computer (or other electronic devices) to perform a process according to the invention as described above.

Figure 12:
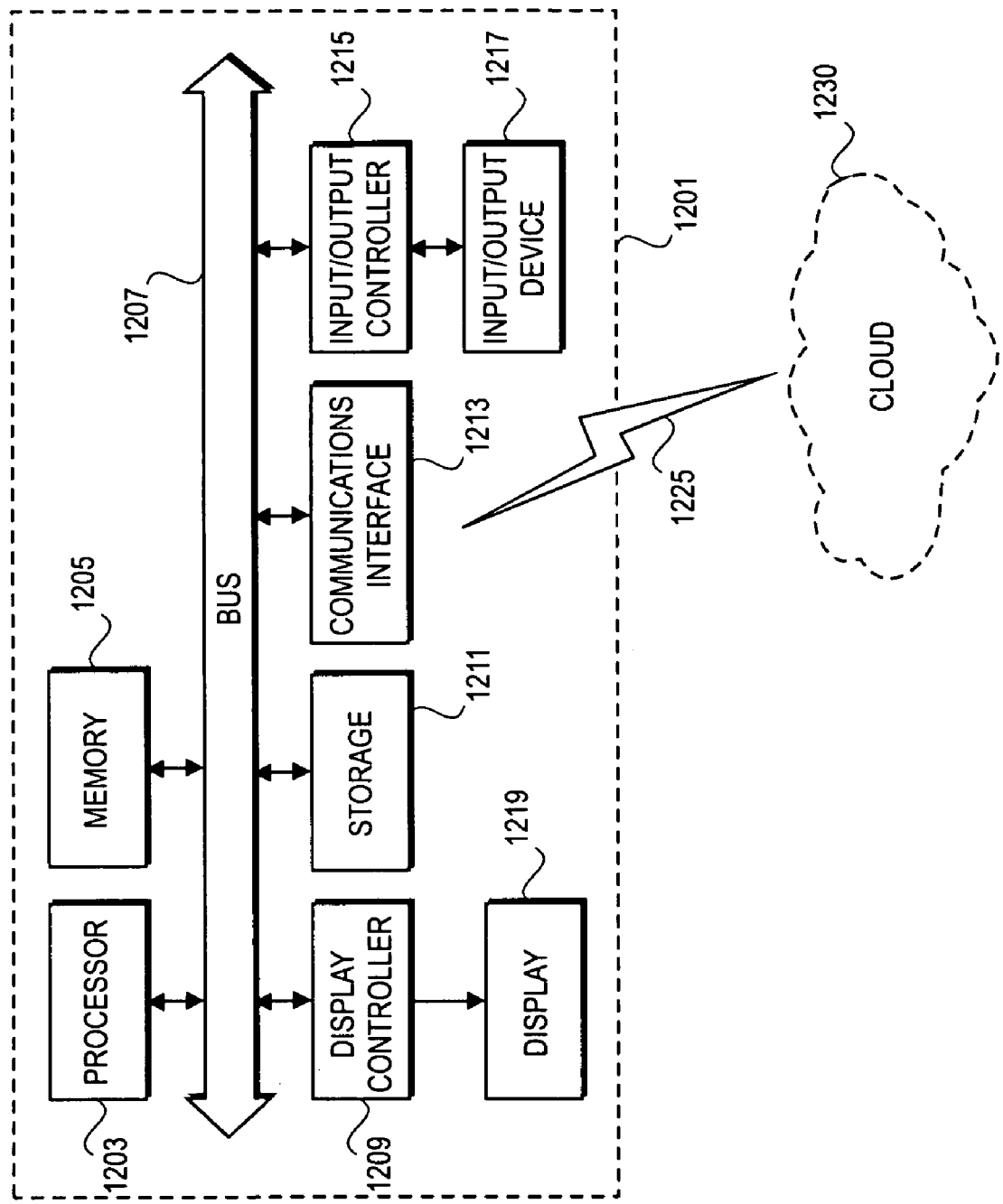
FIG. 12 is a block diagram that illustrates a digital processing system in accordance with one embodiment of the invention.

FIG. 12 illustrates an embodiment of a digital processing system that may be used for the server DPS 320, or client DPSs 305–308, as discussed above in reference to FIG. 3, in accordance with an embodiment of the invention. For alternative embodiments of the present invention, processing system 1201 may be a computer or a set top box that includes a processor 1203 coupled to a bus 1207. In one embodiment, memory 1205, storage 1211, display controller 1209, communications interface 1213, and input/output controller 1215 are also coupled to bus 1207.

Processing system 1201 interfaces to external systems through communications interface 1213. Communications interface 1213 may include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices. Communications interface 1213 may also include a radio transceiver or wireless telephone signals, or the like.

For one embodiment of the present invention, communication signal 1225 is received/transmitted between communications interface 1213 and the cloud 1230. In one embodiment of the present invention, a communication signal 1225 may be used to interface processing system 1201 with another computer system, a network hub, router, or the like. In one embodiment of the present invention, communication signal 1225 is considered to be machine readable media, which may be transmitted through wires, cables, optical fibers or through the atmosphere, or the like.

In one embodiment of the present invention, processor 1203 may be a conventional microprocessor, such as, for example, but not limited to, an Intel Pentium family microprocessor, a Motorola family microprocessor, or the like. Memory 1205 may be a machine-readable medium such as dynamic random access memory (DRAM) and may include static random access memory (SRAM). Display controller 1209 controls, in a conventional manner, a display 1219, which in one embodiment of the invention, may be a cathode ray tube (CRT), a liquid crystal display (LCD), an active matrix display, a television monitor, or the like. The input/output device 1217, coupled to input/output controller 1215, may be a keyboard, disk drive, printer, scanner and other input and output devices, including a mouse, trackball, trackpad, or the like.

Storage 1211 may include machine-readable media such as, for example, but not limited to, a magnetic hard disk, a floppy disk, an optical disk, a smart card or another form of storage for data. In one embodiment of the present invention, storage 1211 may include removable media, read-only media, readable/writable media, or the like. Some of the data may be written by a direct memory access process, into memory 1205 during execution of software in computer system 1201. It is appreciated that software may reside in storage 1211, memory 1205, or may be transmitted or received via modem or communications interface 1213. For the purposes of the specification, the term "machine readable medium" shall be taken to include any medium that is capable of storing data, information or encoding a sequence of instructions for execution by processor 1203 to cause processor 1203 to perform the methodologies of the present invention. The term "machine readable medium" shall be taken to include, but is not limited to, solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    presenting a set of conceptually related information to a plurality of users;
    receiving one or more responses from each of two or more users, the responses in regard to a presentation of the conceptually related information;
    correlating the responses from two or more users, the correlation being a pick-to-query correlation or a pick-to-pick correlation, wherein a pick-to-query correlation associates queries recorded during a user session that are correlated with a pick issued during the user session and a pick-to-pick correlation associates picks issued during the user session with other picks issued during the user session; and
    modifying the presentation of the conceptually related information based upon correlated responses.

2. The method of claim 1 wherein the set of conceptually related information comprises one or more distinctly formulated gathering pages having varying presentation.

3. The method of claim 2 wherein the one or more responses comprise selected and non-selected portions of the set of conceptually related information.

4. The method of claim 3 wherein modifying the presentation of the conceptually related information based upon correlated responses includes reformulating one or more of the gathering pages.

5. The method of claim 1 wherein the responses received from each of the two or more users are search engine activity information of each respective user.

6. The method of claim 5 wherein modifying the presentation of the conceptually related information includes associating particular information with a corresponding user query.

7. The method of claim 5 wherein the search activity information includes all of the information of a user search engine session.

8. The method of claim 5 wherein the responses received from each of the two or more users are selected from the group of search engine activity information consisting of query-to-pick information, pick-to-query information, pick-to-pick information, query-to-query information, and combinations thereof.

9. A system comprising:
    a server digital processing system (DPS) to communicate a set of conceptually related information to a plurality of client DPSs, receive one or more user responses from each of two or more users, the responses in regard to a presentation of the conceptually related information, correlate the responses from two or more users, the correlation being a pick-to-query correlation or a pick-to-pick correlation, wherein a pick-to-query correlation associates queries recorded during a user session that are correlated with a pick issued during the user session and a pick-to-pick correlation associates picks issued during the user session with other picks issued during the user session, and modify the presentation of the conceptually related information based upon correlated responses; and
    one or more client DPSs to present the conceptually related information to a plurality of users and communicate the user responses to the server DPS.

10. The system of claim 9 wherein the set of conceptually related information comprises one or more distinctly formulated gathering pages having varying presentation.

11. The system of claim 10 wherein the one or more responses comprise selected and non-selected portions of the set of conceptually related information.

12. The system of claim 11 wherein modifying the presentation of the conceptually related information based upon correlated responses includes reformulating one or more of the gathering pages.

13. The system of claim 9 wherein the responses received from each of the two or more users are search engine activity information of each respective user.

14. The system of claim 13 wherein modifying the presentation of the conceptually related information includes associating particular information with a corresponding user query.

15. The system of claim 13 wherein the search activity information includes all of the information of a user search engine session.

16. The system of claim 13 wherein the responses received from each of the two or more users are selected from the group of search engine activity information consisting of query-to-pick information, pick-to-query information, pick-to-pick information, query-to-query information, and combinations thereof.

17. A machine-readable storage medium that provides executable instructions which, when executed by a processor, cause the processor to perform a method comprising:
    presenting a set of conceptually related information to a plurality of users;
    receiving one or more responses from each of two or more users, the responses in regard to a presentation of the conceptually related information;
    correlating the responses from two or more users, the correlation being a pick-to-query correlation or a pick-to-pick correlation, wherein a pick-to-query correlation associates queries recorded during a user session that are correlated with a pick issued during the user session and a pick-to-pick correlation associates picks issued during the user session with other picks issued during the user session; and
    modifying the presentation of the conceptually related information based upon correlated responses.

18. The machine-readable medium of claim 17 wherein the set of conceptually related information comprises one or more distinctly formulated gathering pages having varying presentation.

19. The machine-readable medium of claim 18 wherein the one or more responses comprise selected and non-selected portions of the set of conceptually related information.

20. The machine-readable medium of claim 19 wherein modifying the presentation of the conceptually related information based upon correlated responses includes reformulating one or more of the gathering pages.

21. The machine-readable medium of claim 17 wherein the responses received from each of the two or more users are search engine activity information of each respective user.

22. The machine-readable medium of claim 21 wherein modifying the presentation of the conceptually related information includes associating particular information with a corresponding user query.

23. The machine-readable medium of claim 21 wherein the search activity information includes all of the information of a user search engine session.

24. The machine-readable medium of claim 21 wherein the responses received from each of the two or more users are selected from the group of search engine activity information consisting of query-to-pick information, pick-to-query information, pick-to-pick information, query-to-query information, and combinations thereof.

* * * * *